(12) United States Patent
Hahn-Carlson

(10) Patent No.: US 8,560,439 B2
(45) Date of Patent: Oct. 15, 2013

(54) TRANSACTION PROCESSING WITH CORE AND DISTRIBUTOR PROCESSOR IMPLEMENTATIONS

(75) Inventor: Dean W. Hahn-Carlson, Lilydale, MN (US)

(73) Assignee: Syncada LLC, Minneapolis, MN (US)

( * ) Notice: Subject to any disclaimer, the term of this patent is extended or adjusted under 35 U.S.C. 154(b) by 1688 days.

(21) Appl. No.: 11/149,947

(22) Filed: Jun. 9, 2005

(65) Prior Publication Data

US 2005/0278251 A1 Dec. 15, 2005

Related U.S. Application Data

(60) Provisional application No. 60/578,375, filed on Jun. 9, 2004.

(51) Int. Cl.
*G06Q 40/00* (2012.01)
*G06Q 20/10* (2012.01)

(52) U.S. Cl.
CPC ............... *G06Q 40/00* (2013.01); *G06Q 20/10* (2013.01)
USPC .............................................. 705/39; 705/35

(58) Field of Classification Search
CPC .............................. G06Q 40/00; G06Q 20/10
USPC ..................................... 705/39, 35
See application file for complete search history.

(56) References Cited

U.S. PATENT DOCUMENTS

| 4,114,027 A | 9/1978 | Slater et al. |
|---|---|---|
| 4,270,042 A | 5/1981 | Case |
| 4,305,059 A | 12/1981 | Benton |
| 4,412,287 A | 10/1983 | Braddock, III |
| 4,507,778 A | 3/1985 | Tan |
| 4,567,359 A | 1/1986 | Lockwood |
| 4,713,761 A | 12/1987 | Sharpe et al. |
| 4,725,719 A | 2/1988 | Oncken et al. |
| 4,750,119 A | 6/1988 | Cohen et al. |
| 4,799,156 A | 1/1989 | Shavit et al. |
| 4,926,325 A | 5/1990 | Benton et al. |
| 4,949,272 A | 8/1990 | Vanourek et al. |
| 4,960,981 A | 10/1990 | Benton et al. |
| 4,992,940 A | 2/1991 | Dworkin |
| 4,995,112 A | 2/1991 | Aoyama |

(Continued)

FOREIGN PATENT DOCUMENTS

| EP | 0339850 A2 | 2/1989 |
|---|---|---|
| EP | 0407026 A2 | 1/1991 |

(Continued)

OTHER PUBLICATIONS

Retailers pay the price for debit card confusion. (1992). Bank Network News, 10(19), 5-5. Retrieved May 30, 2013.*

(Continued)

*Primary Examiner* — Kito R Robinson
(74) *Attorney, Agent, or Firm* — Shumaker & Sieffert, P.A.

(57) ABSTRACT

Transaction processing for distributor-based transactions is facilitated. According to an example embodiment of the present invention, a transaction management approach involves the processing of aspects of a transaction between contracting parties using transaction rules associated with an administrator and at least one distributor sponsoring the transaction. In some applications, the administrator finances the transaction. Fees are assessed as a function of the transaction processing on behalf of the administrator and, in come instances, the distributor.

23 Claims, 5 Drawing Sheets

(56) References Cited

U.S. PATENT DOCUMENTS

| | | |
|---|---|---|
| 4,996,662 A | 2/1991 | Cooper et al. |
| 5,008,827 A | 4/1991 | Sansone et al. |
| 5,017,766 A | 5/1991 | Tamada et al. |
| 5,025,372 A | 6/1991 | Burton et al. |
| 5,040,132 A | 8/1991 | Schuricht et al. |
| 5,043,908 A | 8/1991 | Manduley et al. |
| 5,054,096 A | 10/1991 | Beizer |
| 5,077,694 A | 12/1991 | Sansone et al. |
| 5,117,364 A | 5/1992 | Barns-Slavin et al. |
| 5,151,948 A | 9/1992 | Lyke |
| 5,153,842 A | 10/1992 | Dlugos, Sr. et al. |
| 5,159,667 A | 10/1992 | Borrey et al. |
| 5,161,109 A | 11/1992 | Keating et al. |
| 5,168,444 A | 12/1992 | Cukor et al. |
| 5,175,416 A | 12/1992 | Mansvelt et al. |
| 5,208,446 A | 5/1993 | Martinez |
| 5,218,188 A | 6/1993 | Hanson |
| 5,220,501 A | 6/1993 | Lawlor et al. |
| 5,222,018 A | 6/1993 | Sharpe et al. |
| 5,231,569 A | 7/1993 | Myatt et al. |
| 5,238,349 A | 8/1993 | Grace, Sr. |
| 5,285,383 A | 2/1994 | Lingrey et al. |
| 5,293,310 A | 3/1994 | Carroll et al. |
| 5,329,589 A | 7/1994 | Fraser et al. |
| 5,334,823 A | 8/1994 | Noblett, Jr. et al. |
| 5,334,824 A | 8/1994 | Martinez |
| 5,337,246 A | 8/1994 | Carroll et al. |
| 5,357,563 A | 10/1994 | Hamilton et al. |
| 5,393,963 A | 2/1995 | Thomas et al. |
| 5,426,281 A | 6/1995 | Abecassis |
| 5,440,634 A | 8/1995 | Jones et al. |
| 5,483,445 A | 1/1996 | Pickering |
| 5,485,369 A | 1/1996 | Nicholls et al. |
| 5,500,513 A | 3/1996 | Langhans et al. |
| 5,631,821 A | 5/1997 | Muso |
| 5,631,827 A | 5/1997 | Nicholls et al. |
| 5,652,749 A | 7/1997 | Davenport et al. |
| 5,666,493 A | 9/1997 | Wojcik et al. |
| 5,671,362 A | 9/1997 | Cowe et al. |
| 5,677,955 A | 10/1997 | Doggett et al. |
| 5,694,334 A | 12/1997 | Donahue et al. |
| 5,694,551 A | 12/1997 | Doyle et al. |
| 5,699,528 A | 12/1997 | Hogan |
| 5,712,990 A | 1/1998 | Henderson |
| 5,717,989 A * | 2/1998 | Tozzoli et al. .................. 705/37 |
| 5,719,771 A | 2/1998 | Buck et al. |
| 5,732,400 A | 3/1998 | Mandler |
| 5,754,854 A | 5/1998 | Kanamori et al. |
| 5,770,844 A | 6/1998 | Henn |
| 5,774,170 A | 6/1998 | Hite et al. |
| 5,790,790 A | 8/1998 | Smith et al. |
| 5,794,207 A | 8/1998 | Walker et al. |
| 5,799,286 A | 8/1998 | Morgan et al. |
| 5,806,063 A | 9/1998 | Dickens |
| 5,842,178 A | 11/1998 | Giovannoli |
| 5,845,283 A | 12/1998 | Williams |
| 5,870,719 A | 2/1999 | Maritzen et al. |
| 5,892,900 A | 4/1999 | Ginter et al. |
| 5,893,080 A | 4/1999 | McGurl et al. |
| 5,896,530 A | 4/1999 | White |
| 5,897,645 A | 4/1999 | Watters |
| 5,910,896 A | 6/1999 | Hahn-Carlson |
| 5,917,830 A | 6/1999 | Chen et al. |
| 5,918,216 A | 6/1999 | Miksovsky et al. |
| 5,918,229 A | 6/1999 | Davis et al. |
| 5,920,847 A | 7/1999 | Kolling et al. |
| 5,924,082 A | 7/1999 | Silverman et al. |
| 5,924,083 A | 7/1999 | Silverman et al. |
| 5,930,363 A | 7/1999 | Stanford et al. |
| 5,931,917 A | 8/1999 | Nguyen et al. |
| 5,943,670 A | 8/1999 | Prager et al. |
| 5,956,690 A | 9/1999 | Haggerson et al. |
| 5,956,700 A | 9/1999 | Landry |
| 5,960,407 A | 9/1999 | Vivona |
| 5,970,475 A | 10/1999 | Barnes et al. |
| 5,973,685 A | 10/1999 | Schaffa et al. |
| 5,978,567 A | 11/1999 | Rebane et al. |
| 5,982,891 A | 11/1999 | Ginter et al. |
| 5,987,506 A | 11/1999 | Carter et al. |
| 5,991,728 A | 11/1999 | Debusk et al. |
| 5,991,801 A | 11/1999 | Rebec et al. |
| 5,995,976 A | 11/1999 | Walker et al. |
| 6,012,041 A | 1/2000 | Brewer et al. |
| 6,016,477 A | 1/2000 | Ehnebuske et al. |
| 6,021,202 A | 2/2000 | Anderson et al. |
| 6,026,374 A | 2/2000 | Chess |
| 6,029,140 A | 2/2000 | Martin et al. |
| 6,029,150 A | 2/2000 | Kravitz |
| 6,043,819 A | 3/2000 | LeBrun et al. |
| 6,044,362 A | 3/2000 | Neely |
| 6,047,268 A | 4/2000 | Bartoli et al. |
| 6,055,519 A | 4/2000 | Kennedy et al. |
| 6,058,380 A | 5/2000 | Anderson et al. |
| 6,070,150 A | 5/2000 | Remington et al. |
| 6,085,200 A | 7/2000 | Hill et al. |
| 6,097,834 A | 8/2000 | Krouse et al. |
| 6,115,649 A | 9/2000 | Sakata |
| 6,115,711 A | 9/2000 | White |
| 6,119,163 A | 9/2000 | Montiero et al. |
| 6,128,602 A * | 10/2000 | Northington et al. ........... 705/35 |
| 6,131,087 A | 10/2000 | Luke et al. |
| 6,141,653 A | 10/2000 | Conklin et al. |
| 6,151,588 A | 11/2000 | Tozzoli et al. |
| 6,157,924 A | 12/2000 | Austin |
| 6,167,378 A * | 12/2000 | Webber, Jr. .................. 705/7.25 |
| 6,169,542 B1 | 1/2001 | Hooks et al. |
| 6,199,046 B1 | 3/2001 | Heinzle et al. |
| 6,204,763 B1 | 3/2001 | Sone |
| 6,209,095 B1 | 3/2001 | Anderson et al. |
| 6,223,168 B1 | 4/2001 | McGurl et al. |
| 6,236,972 B1 | 5/2001 | Shkedy |
| 6,246,994 B1 | 6/2001 | Wolven et al. |
| 6,254,000 B1 | 7/2001 | Degen et al. |
| 6,260,024 B1 | 7/2001 | Shkedy |
| 6,266,640 B1 | 7/2001 | Fromm et al. |
| 6,267,292 B1 | 7/2001 | Walker et al. |
| 6,275,813 B1 | 8/2001 | Berka |
| 6,285,916 B1 | 9/2001 | Kadaba et al. |
| 6,317,737 B1 | 11/2001 | Gorelik et al. |
| 6,323,894 B1 | 11/2001 | Katz |
| 6,324,522 B2 | 11/2001 | Peterson et al. |
| 6,324,551 B1 | 11/2001 | Lamping et al. |
| 6,330,550 B1 | 12/2001 | Brisebois et al. |
| 6,338,044 B1 | 1/2002 | Cook et al. |
| 6,357,042 B2 | 3/2002 | Srinivasan et al. |
| 6,366,829 B1 | 4/2002 | Wallace |
| 6,381,587 B1 | 4/2002 | Guzelsu |
| 6,389,402 B1 | 5/2002 | Ginter et al. |
| 6,418,441 B1 | 7/2002 | Call |
| 6,421,691 B1 | 7/2002 | Kajitani |
| 6,442,533 B1 | 8/2002 | Hinkle |
| 6,477,510 B1 | 11/2002 | Johnson |
| 6,486,899 B1 | 11/2002 | Bush et al. |
| 6,490,567 B1 | 12/2002 | Gregory |
| 6,493,685 B1 | 12/2002 | Ensel et al. |
| 6,499,036 B1 | 12/2002 | Gurevich |
| 6,505,169 B1 | 1/2003 | Bhagavath et al. |
| 6,505,172 B1 | 1/2003 | Johnson et al. |
| 6,507,826 B1 | 1/2003 | Maners |
| 6,510,383 B1 | 1/2003 | Jones |
| 6,510,384 B2 | 1/2003 | Okano |
| 6,526,443 B1 | 2/2003 | Goldsmith et al. |
| 6,539,360 B1 | 3/2003 | Kadaba |
| 6,571,149 B1 | 5/2003 | Hahn-Carlson |
| 6,598,026 B1 | 7/2003 | Ojha et al. |
| 6,607,081 B2 | 8/2003 | Graef et al. |
| 6,629,081 B1 | 9/2003 | Cornelius et al. |
| 6,673,479 B2 | 1/2004 | McArthur et al. |
| 6,684,384 B1 | 1/2004 | Bickerton et al. |
| 6,687,713 B2 | 2/2004 | Mattson et al. |
| 6,697,702 B1 | 2/2004 | Hahn-Carlson |
| 6,704,612 B1 | 3/2004 | Hahn-Carlson |
| 6,721,613 B1 | 4/2004 | Yamamoto et al. |
| 6,721,715 B2 | 4/2004 | Nemzow |

(56) References Cited

U.S. PATENT DOCUMENTS

| | | |
|---|---|---|
| 6,741,968 B2 | 5/2004 | Jacoves et al. |
| 6,751,630 B1 | 6/2004 | Franks et al. |
| 6,785,661 B1 | 8/2004 | Mandler et al. |
| 6,789,252 B1 | 9/2004 | Burke et al. |
| 6,792,459 B2 | 9/2004 | Elnozahy et al. |
| 6,820,038 B1 | 11/2004 | Wetzer et al. |
| 6,829,590 B1 | 12/2004 | Greener et al. |
| 6,832,212 B1 | 12/2004 | Zenner et al. |
| 6,833,865 B1 | 12/2004 | Fuller et al. |
| 6,850,900 B1 | 2/2005 | Hare et al. |
| 6,873,963 B1 | 3/2005 | Westbury et al. |
| 6,873,997 B1 | 3/2005 | Majjasie et al. |
| 6,879,962 B1 | 4/2005 | Smith et al. |
| 6,882,983 B2 | 4/2005 | Furphy et al. |
| 6,882,986 B1 | 4/2005 | Heinemann et al. |
| 6,889,194 B1 | 5/2005 | Kadaba |
| 6,895,438 B1 | 5/2005 | Ulrich |
| 6,915,268 B2 | 7/2005 | Riggs et al. |
| 6,937,992 B1 | 8/2005 | Benda et al. |
| 6,941,281 B1 | 9/2005 | Johnson |
| 6,944,595 B1 | 9/2005 | Graser et al. |
| 6,973,258 B1 | 12/2005 | Yoo et al. |
| 6,983,278 B1 | 1/2006 | Yu et al. |
| 6,988,111 B2 | 1/2006 | Chow et al. |
| 6,999,943 B1 | 2/2006 | Johnson et al. |
| 7,047,210 B1 | 5/2006 | Srinivasan |
| 7,054,841 B1 | 5/2006 | Tenorio |
| 7,069,234 B1 | 6/2006 | Cornelius et al. |
| 7,069,248 B2 | 6/2006 | Huber |
| 7,076,652 B2 | 7/2006 | Ginter et al. |
| 7,079,176 B1 | 7/2006 | Freeman et al. |
| 7,099,304 B2 | 8/2006 | Liu et al. |
| 7,110,959 B2 | 9/2006 | Hahn-Carlson |
| 7,110,979 B2 | 9/2006 | Tree |
| 7,113,964 B1 | 9/2006 | Bequet et al. |
| 7,117,170 B1 | 10/2006 | Bennett et al. |
| 7,120,871 B1 | 10/2006 | Harrington |
| 7,124,150 B2 | 10/2006 | Majjasie et al. |
| 7,130,822 B1 | 10/2006 | Their et al. |
| 7,131,069 B1 | 10/2006 | Rush et al. |
| 7,133,835 B1 | 11/2006 | Fusz et al. |
| 7,136,467 B2 | 11/2006 | Brockman et al. |
| 7,143,058 B2 | 11/2006 | Sugimoto et al. |
| 7,146,337 B1 | 12/2006 | Ward et al. |
| 7,149,744 B1 | 12/2006 | Tenorio |
| 7,162,458 B1 | 1/2007 | Flanagan et al. |
| 7,177,836 B1 | 2/2007 | German et al. |
| 7,181,017 B1 | 2/2007 | Nagel et al. |
| 7,203,662 B2 | 4/2007 | Das et al. |
| 7,206,768 B1 | 4/2007 | DeGroeve et al. |
| 7,222,081 B1 | 5/2007 | Sone |
| 7,243,139 B2 | 7/2007 | Ullman et al. |
| 7,254,588 B2 | 8/2007 | Sung et al. |
| 7,257,560 B2 | 8/2007 | Jacobs et al. |
| 7,263,506 B2 | 8/2007 | Lee et al. |
| 7,324,976 B2 | 1/2008 | Gupta et al. |
| 7,327,952 B2 | 2/2008 | Enomoto |
| 7,340,433 B1 | 3/2008 | Kay et al. |
| 7,346,575 B1 | 3/2008 | Ahles et al. |
| 7,363,261 B2 | 4/2008 | Whitehead et al. |
| 7,373,365 B2 | 5/2008 | Varadarajan et al. |
| 7,386,502 B1 | 6/2008 | Butcher, III |
| 7,392,934 B2 | 7/2008 | Hahn-Carlson et al. |
| 7,415,471 B1 | 8/2008 | Coleman |
| 7,415,617 B2 | 8/2008 | Ginter et al. |
| 7,433,845 B1 | 10/2008 | Flitcroft et al. |
| 7,437,310 B1 | 10/2008 | Dutta |
| 7,448,063 B2 | 11/2008 | Freeman et al. |
| 7,475,024 B1 | 1/2009 | Phan |
| 7,496,519 B2 | 2/2009 | Hahn-Carlson et al. |
| 7,499,875 B1 | 3/2009 | May et al. |
| 7,529,706 B2 | 5/2009 | Kulasooriya et al. |
| 7,536,354 B1 | 5/2009 | DeGroeve et al. |
| 7,536,362 B2 | 5/2009 | Starr et al. |
| 7,548,884 B1 | 6/2009 | Thomas |
| 7,558,793 B1 | 7/2009 | Topolovac et al. |
| 7,574,363 B2 | 8/2009 | Bodin |
| 7,574,386 B2 | 8/2009 | Hahn-Carlson et al. |
| 7,587,363 B2 | 9/2009 | Cataline et al. |
| 7,590,575 B2 | 9/2009 | Yu et al. |
| 7,617,146 B2 | 11/2009 | Keaton et al. |
| 7,627,499 B2 | 12/2009 | Hahn-Carlson |
| 7,634,455 B1 | 12/2009 | Keene et al. |
| 7,640,195 B2 | 12/2009 | Von Zimmermann et al. |
| 7,660,788 B1 | 2/2010 | Clark |
| 7,693,791 B2 | 4/2010 | Hahn-Carlson et al. |
| 7,702,563 B2 | 4/2010 | Balson et al. |
| 7,725,372 B2 | 5/2010 | Hahn-Carlson |
| 7,765,136 B2 | 7/2010 | Northington et al. |
| 7,822,653 B2 | 10/2010 | Hahn-Carlson et al. |
| 7,890,395 B2 | 2/2011 | Phelan |
| 7,925,551 B2 | 4/2011 | Hahn-Carlson et al. |
| 7,970,671 B2 | 6/2011 | Hahn-Carlson et al. |
| 8,050,938 B1 | 11/2011 | Green et al. |
| 8,060,410 B2 | 11/2011 | Hahn-Carlson |
| 8,069,054 B2 | 11/2011 | Hahn-Carlson et al. |
| 8,103,575 B1 | 1/2012 | Hinkle |
| 8,126,785 B2 | 2/2012 | Hahn-Carlson et al. |
| 8,392,285 B2 * | 3/2013 | Hahn-Carlson .............. 705/26.8 |
| 2001/0009002 A1 | 7/2001 | Logan et al. |
| 2001/0011241 A1 | 8/2001 | Nemzow |
| 2001/0014878 A1 | 8/2001 | Mitra |
| 2001/0025262 A1 | 9/2001 | Ahmed |
| 2001/0032154 A1 | 10/2001 | Schlummer et al. |
| 2001/0032171 A1 | 10/2001 | Brink et al. |
| 2001/0032183 A1 | 10/2001 | Landry |
| 2001/0039522 A1 | 11/2001 | Saxon |
| 2001/0047311 A1 | 11/2001 | Singh |
| 2001/0056395 A1 | 12/2001 | Khan |
| 2002/0007302 A1 | 1/2002 | Work et al. |
| 2002/0016765 A1 | 2/2002 | Sacks et al. |
| 2002/0026374 A1 | 2/2002 | Moneymaker et al. |
| 2002/0032649 A1 | 3/2002 | Selvarajan |
| 2002/0035488 A1 | 3/2002 | Aquila et al. |
| 2002/0038277 A1 | 3/2002 | Yuan |
| 2002/0038305 A1 | 3/2002 | Bahl et al. |
| 2002/0040304 A1 | 4/2002 | Shenoy et al. |
| 2002/0042782 A1 | 4/2002 | Albazz et al. |
| 2002/0046081 A1 | 4/2002 | Albazz et al. |
| 2002/0046125 A1 | 4/2002 | Speicher et al. |
| 2002/0046147 A1 | 4/2002 | Livesay et al. |
| 2002/0046169 A1 | 4/2002 | Keresman et al. |
| 2002/0048369 A1 | 4/2002 | Ginter et al. |
| 2002/0049622 A1 | 4/2002 | Lettich et al. |
| 2002/0055850 A1 | 5/2002 | Powell et al. |
| 2002/0059122 A1 | 5/2002 | Inoue et al. |
| 2002/0059134 A1 | 5/2002 | Ebbs et al. |
| 2002/0062278 A1 | 5/2002 | Ingram et al. |
| 2002/0065736 A1 | 5/2002 | Willner et al. |
| 2002/0065738 A1 | 5/2002 | Riggs et al. |
| 2002/0069177 A1 | 6/2002 | Carrott et al. |
| 2002/0072956 A1 | 6/2002 | Willems et al. |
| 2002/0077978 A1 | 6/2002 | O'Leary et al. |
| 2002/0087344 A1 | 7/2002 | Billings et al. |
| 2002/0087455 A1 | 7/2002 | Tsagarakis |
| 2002/0095355 A1 | 7/2002 | Walker et al. |
| 2002/0103661 A1 | 8/2002 | Albazz et al. |
| 2002/0107761 A1 | 8/2002 | Kark et al. |
| 2002/0107794 A1 | 8/2002 | Furphy et al. |
| 2002/0111886 A1 | 8/2002 | Chenevich et al. |
| 2002/0116288 A1 | 8/2002 | Nakajima |
| 2002/0116334 A1 | 8/2002 | Bennett et al. |
| 2002/0116348 A1 | 8/2002 | Phillips et al. |
| 2002/0120570 A1 | 8/2002 | Loy |
| 2002/0123919 A1 | 9/2002 | Brockman et al. |
| 2002/0123973 A1 | 9/2002 | Eccles et al. |
| 2002/0143858 A1 | 10/2002 | Teague et al. |
| 2002/0147655 A1 | 10/2002 | Say |
| 2002/0156797 A1 | 10/2002 | Lee et al. |
| 2002/0161719 A1 | 10/2002 | Manning et al. |
| 2002/0174034 A1 | 11/2002 | Au et al. |
| 2002/0184527 A1 | 12/2002 | Chun et al. |
| 2002/0194174 A1 | 12/2002 | Calkins et al. |
| 2002/0198829 A1 | 12/2002 | Ludwig et al. |

(56) References Cited

U.S. PATENT DOCUMENTS

| | | |
|---|---|---|
| 2002/0198833 A1 | 12/2002 | Wohlstadter |
| 2003/0004823 A1 | 1/2003 | Sagy |
| 2003/0005876 A1 | 1/2003 | Boswell |
| 2003/0014325 A1 | 1/2003 | Biffar et al. |
| 2003/0018563 A1 | 1/2003 | Kilgour et al. |
| 2003/0026404 A1 | 2/2003 | Joyce et al. |
| 2003/0033205 A1 | 2/2003 | Nowers et al. |
| 2003/0033240 A1 | 2/2003 | Balson et al. |
| 2003/0041008 A1 | 2/2003 | Grey et al. |
| 2003/0046089 A1 | 3/2003 | Menninger et al. |
| 2003/0050876 A1 | 3/2003 | Tawara et al. |
| 2003/0055675 A1* | 3/2003 | Klein Twennaar ............ 705/1 |
| 2003/0055779 A1 | 3/2003 | Wolf |
| 2003/0055783 A1 | 3/2003 | Cataline et al. |
| 2003/0074206 A1 | 4/2003 | Hoffman et al. |
| 2003/0074298 A1 | 4/2003 | Duam |
| 2003/0093320 A1 | 5/2003 | Sullivan |
| 2003/0097318 A1 | 5/2003 | Yu et al. |
| 2003/0115129 A1 | 6/2003 | Feaver |
| 2003/0117446 A1 | 6/2003 | Esposito-Ross et al. |
| 2003/0126047 A1 | 7/2003 | Hollar et al. |
| 2003/0135425 A1* | 7/2003 | Leavitt ............................ 705/26 |
| 2003/0135435 A1 | 7/2003 | Aharoni |
| 2003/0139985 A1 | 7/2003 | Hollar et al. |
| 2003/0144901 A1 | 7/2003 | Coultier et al. |
| 2003/0149674 A1 | 8/2003 | Good et al. |
| 2003/0154163 A1 | 8/2003 | Phillips et al. |
| 2003/0158811 A1 | 8/2003 | Sanders et al. |
| 2003/0163431 A1 | 8/2003 | Ginter et al. |
| 2003/0187796 A1* | 10/2003 | Swift et al. ..................... 705/45 |
| 2003/0191711 A1 | 10/2003 | Jamison et al. |
| 2003/0195815 A1 | 10/2003 | Li et al. |
| 2003/0200172 A1 | 10/2003 | Randle |
| 2003/0200185 A1 | 10/2003 | Huerta et al. |
| 2003/0212617 A1 | 11/2003 | Stone et al. |
| 2003/0220863 A1 | 11/2003 | Holm et al. |
| 2003/0225883 A1 | 12/2003 | Greaves et al. |
| 2003/0233252 A1 | 12/2003 | Haskell et al. |
| 2003/0233286 A1 | 12/2003 | Hahn-Carlson et al. |
| 2003/0233292 A1 | 12/2003 | Richey et al. |
| 2003/0233321 A1 | 12/2003 | Scolini et al. |
| 2004/0010463 A1 | 1/2004 | Hahn-Carlson et al. |
| 2004/0019562 A1 | 1/2004 | Viberg |
| 2004/0034578 A1 | 2/2004 | Oney et al. |
| 2004/0039696 A1 | 2/2004 | Harmon et al. |
| 2004/0049446 A1 | 3/2004 | Seljeseth |
| 2004/0068431 A1 | 4/2004 | Smith et al. |
| 2004/0095237 A1 | 5/2004 | Chen et al. |
| 2004/0098350 A1 | 5/2004 | Labrou et al. |
| 2004/0098663 A1 | 5/2004 | Rey et al. |
| 2004/0107123 A1 | 6/2004 | Haffner et al. |
| 2004/0107125 A1 | 6/2004 | Guheen et al. |
| 2004/0117383 A1 | 6/2004 | Lee et al. |
| 2004/0123129 A1 | 6/2004 | Ginter et al. |
| 2004/0139032 A1 | 7/2004 | Rowan |
| 2004/0153389 A1 | 8/2004 | Lortscher |
| 2004/0153403 A1 | 8/2004 | Sadre |
| 2004/0153407 A1 | 8/2004 | Clubb et al. |
| 2004/0158510 A1 | 8/2004 | Fisher |
| 2004/0172360 A1 | 9/2004 | Mabrey et al. |
| 2004/0172368 A1 | 9/2004 | Johnson et al. |
| 2004/0181468 A1 | 9/2004 | Harmon et al. |
| 2004/0184163 A1 | 9/2004 | Nishioka et al. |
| 2004/0186806 A1 | 9/2004 | Sinclair et al. |
| 2004/0187075 A1 | 9/2004 | Maxham et al. |
| 2004/0201074 A1 | 10/2004 | Khandros et al. |
| 2004/0225574 A1 | 11/2004 | Arnold et al. |
| 2004/0230536 A1 | 11/2004 | Fung et al. |
| 2004/0230601 A1 | 11/2004 | Joao et al. |
| 2004/0243690 A1 | 12/2004 | Hancock et al. |
| 2004/0254808 A1 | 12/2004 | Bennett et al. |
| 2004/0260634 A1 | 12/2004 | King et al. |
| 2005/0015332 A1 | 1/2005 | Chen |
| 2005/0021363 A1 | 1/2005 | Stimson et al. |
| 2005/0021527 A1 | 1/2005 | Zhang et al. |
| 2005/0027613 A1 | 2/2005 | Takekuma et al. |
| 2005/0027651 A1 | 2/2005 | DeVault et al. |
| 2005/0033660 A1 | 2/2005 | Solomon |
| 2005/0033760 A1 | 2/2005 | Fuller et al. |
| 2005/0055306 A1 | 3/2005 | Miller et al. |
| 2005/0075964 A1 | 4/2005 | Quinn et al. |
| 2005/0119980 A1 | 6/2005 | Kohavi et al. |
| 2005/0125260 A1 | 6/2005 | Green et al. |
| 2005/0131839 A1 | 6/2005 | Cordery et al. |
| 2005/0137947 A1 | 6/2005 | Schaub et al. |
| 2005/0149378 A1 | 7/2005 | Cyr et al. |
| 2005/0165699 A1 | 7/2005 | Hahn-Carlson |
| 2005/0177435 A1 | 8/2005 | Lidow |
| 2005/0177507 A1 | 8/2005 | Bandych et al. |
| 2005/0192896 A1 | 9/2005 | Hutchison et al. |
| 2005/0216368 A1 | 9/2005 | Wechsel |
| 2005/0234820 A1 | 10/2005 | MacKouse |
| 2005/0240592 A1 | 10/2005 | Mamou et al. |
| 2005/0246192 A1 | 11/2005 | Jauffred et al. |
| 2005/0251478 A1 | 11/2005 | Yanavi |
| 2005/0256802 A1 | 11/2005 | Ammermann et al. |
| 2005/0274792 A1 | 12/2005 | Hahn-Carlson et al. |
| 2005/0278220 A1 | 12/2005 | Hahn-Carlson et al. |
| 2005/0278221 A1 | 12/2005 | Hahn-Carlson et al. |
| 2005/0278244 A1 | 12/2005 | Yuan |
| 2005/0278255 A1 | 12/2005 | Hahn-Carlson et al. |
| 2005/0283434 A1 | 12/2005 | Hahn-Carlson et al. |
| 2005/0283437 A1 | 12/2005 | McRae et al. |
| 2005/0289023 A1 | 12/2005 | Hahn-Carlson et al. |
| 2005/0289024 A1 | 12/2005 | Hahn-Carlson |
| 2006/0004670 A1 | 1/2006 | McKenney et al. |
| 2006/0010058 A1 | 1/2006 | D'Hers et al. |
| 2006/0015454 A1 | 1/2006 | Hahn-Carlson |
| 2006/0036476 A1 | 2/2006 | Klem |
| 2006/0116957 A1 | 6/2006 | May et al. |
| 2006/0167762 A1 | 7/2006 | Hahn-Carlson |
| 2006/0167791 A1 | 7/2006 | Hahn-Carlson |
| 2006/0167792 A1 | 7/2006 | Hahn-Carlson |
| 2006/0233334 A1 | 10/2006 | Bingaman et al. |
| 2006/0287983 A1 | 12/2006 | Krauss et al. |
| 2007/0022021 A1 | 1/2007 | Walker et al. |
| 2007/0055582 A1 | 3/2007 | Hahn-Carlson |
| 2007/0136278 A1 | 6/2007 | Grazioli et al. |
| 2007/0156584 A1 | 7/2007 | Barnes et al. |
| 2007/0192178 A1 | 8/2007 | Fung et al. |
| 2007/0208635 A1 | 9/2007 | Van Luchene et al. |
| 2007/0214065 A1 | 9/2007 | Kahlon et al. |
| 2007/0214077 A1 | 9/2007 | Barnes et al. |
| 2007/0246528 A1 | 10/2007 | Kubo et al. |
| 2007/0262140 A1 | 11/2007 | Long |
| 2007/0271160 A1 | 11/2007 | Stone et al. |
| 2007/0282724 A1 | 12/2007 | Barnes et al. |
| 2007/0282744 A1 | 12/2007 | Barnes et al. |
| 2007/0299769 A1 | 12/2007 | Fowler et al. |
| 2008/0082374 A1 | 4/2008 | Kennis et al. |
| 2008/0086396 A1 | 4/2008 | Hahn-Carlson |
| 2008/0103972 A1 | 5/2008 | Lanc |
| 2008/0172314 A1 | 7/2008 | Hahn-Carlson |
| 2008/0215456 A1 | 9/2008 | West et al. |
| 2008/0249940 A1 | 10/2008 | Hahn-Carlson et al. |
| 2009/0171727 A1 | 7/2009 | Hahn-Carlson |
| 2009/0192922 A1 | 7/2009 | Hahn-Carlson |
| 2009/0259576 A1 | 10/2009 | Hahn-Carlson |
| 2009/0265274 A1 | 10/2009 | Hahn-Carlson et al. |
| 2009/0287590 A1 | 11/2009 | Hahn-Carlson |
| 2009/0287598 A1 | 11/2009 | Hahn-Carlson |
| 2009/0292630 A1 | 11/2009 | Hahn-Carlson et al. |
| 2009/0307114 A1 | 12/2009 | Hahn-Carlson |
| 2010/0017315 A1 | 1/2010 | Hahn-Carlson |
| 2010/0049650 A1 | 2/2010 | Keaton et al. |
| 2010/0070397 A1 | 3/2010 | Hahn-Carlson et al. |
| 2010/0138325 A1 | 6/2010 | Hahn-Carlson |
| 2010/0185540 A1 | 7/2010 | Hahn-Carlson et al. |
| 2010/0205054 A1 | 8/2010 | Hahn-Carlson et al. |

(56) References Cited

U.S. PATENT DOCUMENTS

| | | |
|---|---|---|
| 2011/0004544 A1 | 1/2011 | Baum |
| 2011/0029404 A1 | 2/2011 | Hahn-Carlson et al. |

FOREIGN PATENT DOCUMENTS

| | | |
|---|---|---|
| EP | 0425421 A2 | 5/1991 |
| EP | 0 779 587 | 6/1997 |
| EP | 0779587 A2 | 6/1997 |
| FR | 2543327 A1 | 9/1984 |
| GB | 2398894 | 9/2004 |
| GB | 2398894 A | 9/2004 |
| JP | 2001312680 A | 11/2001 |
| WO | WO 97/07468 A1 | 2/1997 |
| WO | WO 99/08218 A1 | 2/1999 |
| WO | WO 00/62225 A1 | 10/2000 |
| WO | WO 01/09782 A2 | 2/2001 |
| WO | WO 01/35570 | 5/2001 |
| WO | WO 01/35570 A1 | 5/2001 |
| WO | WO 01/48659 A1 | 7/2001 |
| WO | WO 01/82193 A1 | 11/2001 |
| WO | WO 01/88813 | 11/2001 |
| WO | WO 01/88813 A1 | 11/2001 |
| WO | WO 0182193 | 11/2001 |
| WO | WO 0188813 | 11/2001 |
| WO | WO 01/26017 | 12/2001 |
| WO | WO 01/26017 A2 | 12/2001 |
| WO | WO 02/21405 A1 | 3/2002 |
| WO | WO 02/06920 A2 | 9/2002 |
| WO | WO 2005/124635 A2 | 12/2005 |
| WO | WO 2006/071881 A2 | 7/2006 |
| WO | WO 2008/045793 A1 | 4/2008 |

OTHER PUBLICATIONS

Weinstein, M. (May 31, 1984,). 10 california institutions to form shared ATM network. American Banker. Retrieved May 30, 2013.*

Spencer et al., "JIT Systems and external logistices suppliers," International Journal of Operations & Production Management, v14, n6, pp. 60-74, 1994.

White, How Computers Work, Sep. 1999, 93 pp.

Professional Builder (1993) www.highbeam.com, Contracts & Law: Part III 8 pp.

South China Morning Post, Hong Kong, Buying "Products over the Net," Jul. 2000, 2 pp.

Xcitek Press Release, "U.S. Bank Selects Xcitek for Corporate Actions Data and XSP for Corporate Actions Automation," NY, NY, Dec. 2003, 1 pp.

Berhad, "Fueling financial oil for the economy," The New Straits Times Press (Malaysia), Dec. 10, 2001, 3 pp.

Singh, "A new road to recovery," Risk, pp. 108-110, Sep. 2004.

"Credit Derivatives and Mortgage-backed Bonds in Capital Adequacy Requirements for Market Risk," http://www.rahoitustarkastus.fi/Eng/Regulation/FSA_standards/FSA_interpretations/4_2005.html, Apr. 2005, 5 pp.

Brochure: SAP Supplier Relationship Management—At a Glance, SAP, 2003, 16 pp.

Brochure: Self-Service Procurement: Slashing Costs and Saving Time, SAP, 2003, 12 pp.

Electronic Commerce News, "Sarbanes-Oxley Continue to be Key Issue in Corporate Payments Space," Sep. 1, 2003, v8, issue 18, 7 pp.

Fletcher, "Limits on reinsurance offsets sought by California regulator," Business Insurance, May 8, 1995 4 pp.

Denver Business Wire, "JD Edwards Continues to drive network-centric applications delivery with OneWorld enhancements," Jun. 16, 1997, p. 06160089.

Notice from the European Patent Office concerning business methods, dated Oct. 1, 2007, 2 pp.

Egan, "Administrative Orders from the Office of the Governer of Alaska," Jul. 18, 1972, 3 pp. http://www.gov.state.ak.us/admin-orders/018.html.

Bodnar, "Estimating Exchange Rate Exposure: Issues in Model Structure," Financial Management v32, nl, pp. 35-67, 2003.

Plewka, "Germany seizes the Emu initiative," International Tax Review, v8, n5, pp. 43-46, May 1997.

Huang, "Exchange Risk and Exchange Rate Pass-Through," v67/02-A of Dissertation Abstracts International, 2005.

U.S. Appl. No. 13/406,247, by Dean Hahn-Carlson, filed Feb. 27, 2012.

McKeefry, "Seeking microcontrollers desperately," Electronic Buyers News, n972, Sep. 11, 1995, 6 pp.

Mallory, Great Plains Accounting v.7 (Great Plains Software's accounting software) (Product Accouncement), Apr. 22, 1993, 3 pp.

Russell, "Kitting out is now in (Use of component kits is expanding as distributors develop added-value activities)," Electronic Times (online), n. 852, Apr. 17, 1997, 4 pp.

* cited by examiner

TRANSACTION PROCESSING WITH CORE AND DISTRIBUTOR PROCESSOR IMPLEMENTATIONS

RELATED PATENT DOCUMENTS

This patent document claims priority under 35 U.S.C. §119 to U.S. Provisional Patent Application No. 60/578,375, entitled "Financial Transaction Processing System and Approach" and filed on Jun. 9, 2004.

FIELD OF THE INVENTION

The present invention is directed to transaction processing and, more specifically, to a transaction processing system and approach involving the processing of a multitude of transactions on behalf of and integrally with distributors and, where appropriate, financing trade-based credit aspects of the processed transactions.

BACKGROUND

Operational management of contractual and transactional interactions between buyers, sellers, financial institutions and others involved in the exchange of products for purposes of commerce have typically been labor and time intensive. Generally, the processes of managing transactions between transaction entities have been unduly burdensome and inefficient.

For many organizations, managing and tracking transaction functions can be particularly burdensome and costly. When a particular organization contracts and otherwise transacts with a large number of suppliers/sellers, the organization typically must interact with each supplier/seller on an individual basis. As the diversity of these interactions increases, the burden and cost associated with managing and tracking transaction functions is exacerbated.

Individual interactions between buyers and sellers are often characterized by specific contracts, payment rules and other financial processing characteristics. For example, certain sellers may require payment terms such as a net payment due within a particular time period, payment to a particular financial institution or payment in a particular currency. In addition, certain sellers may require different payment terms for different contracts. Entity-specific and transaction-specific variances in payment terms can be particularly difficult to manage and track.

In addition, when a transaction reaches the payment step, financial institutions for different parties to the transaction must interact with each other. This interaction typically involves complex agreements and associations that facilitate the transfer of funds. At times, there can be delays in payment or disputes regarding terms of payment. In addition, this process is highly susceptible to error. Interaction complexity, delay and error, as well as a multitude of other characteristics of transaction payment can cost one or more parties to a transaction (including financial institutions) a significant amount of funds.

Attempts have been made to automate certain transaction processes, but these attempts have generally been limited in application to party-specific applications, with processing implementations limited in controllability and accessibility. Where financial institutions are involved, the provision of credit and other finance-based transaction processing has generally required separate disintegrated processing systems. Generally, such approaches have been characterized by significant cost and complexity.

The above and other difficulties in the management and coordination of transactions have presented administrative and cost challenges to entities involved in various aspects of transactions, including processing and financing aspects of transactions.

SUMMARY

The present invention is directed to overcoming the above-mentioned challenges and others related to the types of processing approaches and applications discussed above and in others. The present invention is exemplified in a number of implementations and applications, some of which are summarized below.

According to an example embodiment of the present invention, transaction-based processing is facilitated using separate core and operation processing implementations. The core processing implementation hosts multiple operation processing implementations, facilitating transactions in connection therewith and assessing fees as a function of the transaction facilitation. Each operation processing implementation is distributor-specific, with each distributor using its operation processing implementation in connection with the core processing implementation to facilitate transactions on behalf of a multitude of clients.

In some applications, processing functions and/or data storage functions are maintained in a generally proprietary manner, relative to one or both of the core processing implementation and the operation processing implementation. In this regard, selected processing functions and/or data implemented by the core and operation processing implementations are maintained such that access is limited, e.g., to administrators and/or distributors respectively operating the core and operational implementations. Exchanges between the core and operational implementations are generally directed to the exchange of information used by the respective implementations to execute their respective functions.

According to another example embodiment of the present invention, an automated transaction processing system processes and finances transactions between contracting parties on behalf of a plurality of distributors. Each distributor enters into an agreement with a controller party for processing and financing the transactions, with sets of transaction rules defined as a function a transaction agreement between each distributor and contracting parties sponsored by the distributor. The automated transaction processing system includes a distributor processor implementation for each of the plurality of distributors, each implementation adapted to audit transaction data for each transaction according to a set of transaction rules for at least one of the contracting parties involved in the transaction. A core processor controls an implementation of each distributor processor on behalf of the plurality of distributors as a function of the transaction agreement between each distributor and the controller party. A transaction-finance processor implemented by the controller party facilitates the financing of each transaction as a function of the audit thereof, and a use-fee processor assesses a fee as a function of transactions processed on behalf of each distributor. One or more of the distributor processor implementations, core processor, transaction-finance processor and use-fee processor is implemented in a common transaction arrangement in a common location and/or distributed locations.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention in connection with the accompanying drawings, in which.

Figure 1:
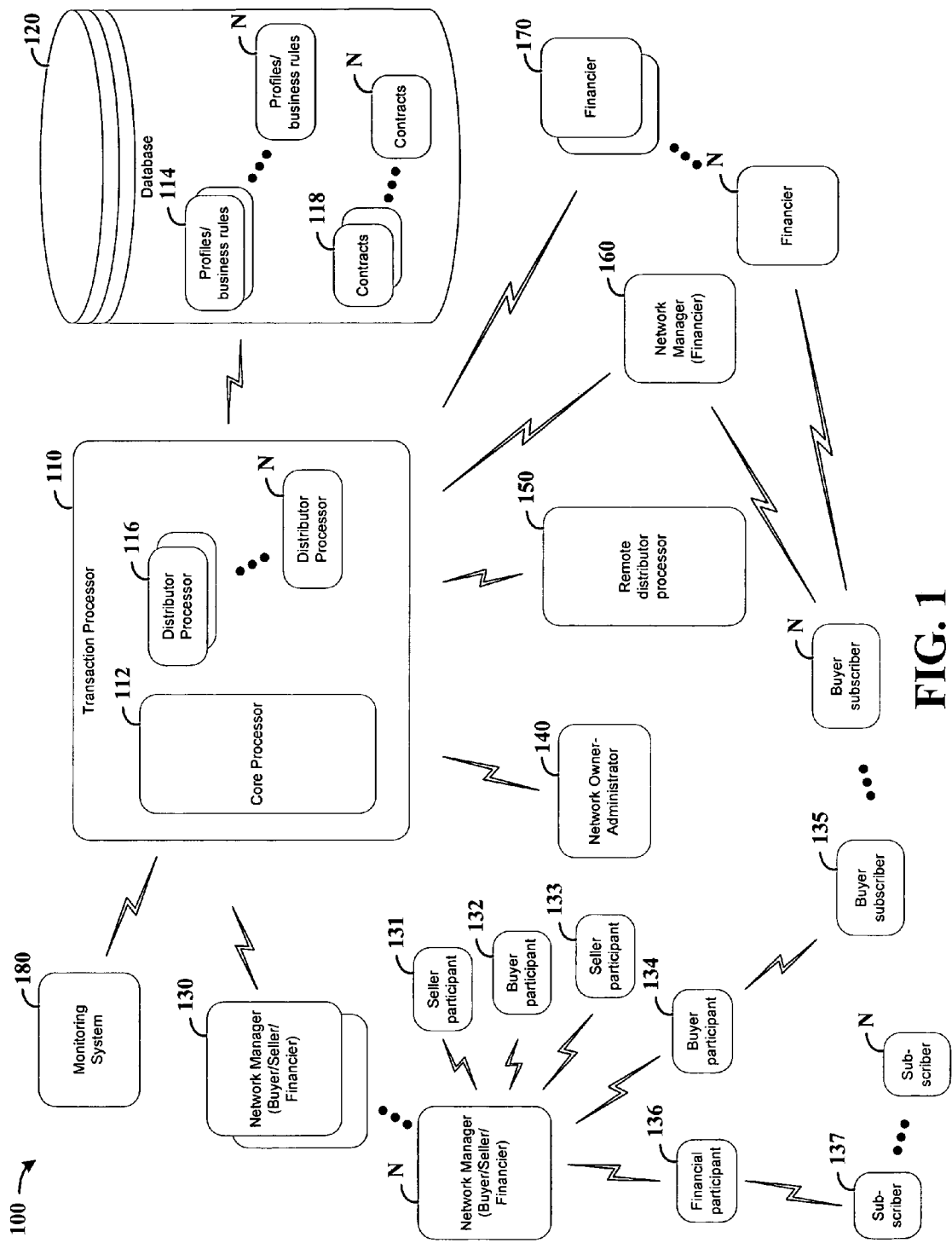
FIG. 1 shows an arrangement and approach for transaction processing involving distinct core and user-specific processing implementations, according to an example embodiment of the present invention.

While the invention is amenable to various modifications and alternative forms, specifics thereof have been shown by way of example in the drawings and will be described in detail. It should be understood, however, that the intention is not necessarily to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of different types of transaction processing and management approaches, and has been found to be particularly useful for applications involving the processing of transaction data in a distributed manner. While the present invention is not necessarily limited to such approaches, various aspects of the invention may be appreciated through a discussion of various examples using these and other contexts.

According to another example embodiment of the present invention, a transaction processing system includes an administrator-based core function and a plurality of distributor-based operational functions. The core function interacts with each of the plurality of distributor-based operational functions for separately processing transactions specific to each operational function. That is, each combination of one of the plurality of distributor-based operational functions operates with the core function to carry out a set of transaction processor functions for a distributor implementing the operational function. The transaction processing system uses business rules for each operational function to tailor the separately processed transactions to the particular distributor for which the corresponding operational function is implemented. In this regard, business rules relating to the administration of the transaction processing system are implemented in connection with business rules for the distributor, with selected processing functions implemented for transactions as specified by the distributor. The transaction processing system facilitates payment for each transaction and assesses processing fees to one or more parties to the transaction.

Each operational function, or aspects thereof, is selectively carried out at a location proprietary to the distributor implementing the operational function or, at the distributor's discretion, by a network system owner or controller implementing the core function. In certain applications, the core and operational functions are carried out in a common processor or processor arrangement that implements two or more processors. For example, each distributor may implement functions for receiving and initially processing data for use at an administrator-based processor, with that data sent to the administrator-based processor, which implements operational functions that are both distributor-based and core functions to process the transaction data. In this regard, operational functions carried out at the proprietary distributor location can be effected independently from those functions carried out at an administrator location, where appropriate data is provided at the distributor location.

In some applications, core and operational processing implementations are proprietary to different transaction institutions. For instance, where a network system owner provides a transaction processor system and the core processing implementation, access to and control of the core processing implementation is carried out in a manner that is proprietary to the network system owner. Where a distributor provides a tailored operational processing implementation, some or all of the operational processing implementation is maintained proprietary to the distributor. In this regard, the network system owner limits the distributor's access to the core processing implementation. Similarly, the distributor may limit the network system owner's access (or other participant's access) to certain aspects of the operational processing implementation where certain processing functions are maintained in a proprietary manner, relative to the distributor. Selective access to the operational processing implementation is granted to the core processor for facilitating transactions (e.g., for extracting transaction data or simply by receiving transaction data sent to the core processing implementation).

To facilitate various arrangements and interactions with core and operational processing implementations as discussed above, a variety of approaches are used to suit particular applications. For example, a relatively simple application involves the use of common processor for different distributors with data that is specific to each distributor used to create an operational processing implementation for that distributor. Another application involves the use of a common processor for different distributors, with the processor calling special programming that is tailored for each distributor in order to process transactions for that distributor. Still another application involves the use of a discrete processor, implemented for a particular distributor and programmed with transaction functions tailored for that distributor. In each of these applications, the operational (distributor) processing implementations interface with the core function.

According to another example embodiment of the present invention, a host processor arrangement implements a rules-based transaction approach in connection with multiple distributor processors for automatically processing transactions. Each distributor processor is associated and operated in accordance with a particular distributor, each particular distributor sponsoring transaction parties into use of the host processor arrangement. The distributor processor provides information to the host processor arrangement, which uses the information to carry out transaction functions on behalf of the distributor. In certain applications, the host and distributor processors are implemented together in a common (locally linked or shared) transaction processor arrangement. In other applications, the host and distributor processors are implemented at distant locations, with communications being effected over a public network such as the Internet.

The host processor manages transaction processing aspects on behalf of each distributor, using transaction processing rules tailored to each distributor. The host processor carries out selected aspects (e.g., transaction and/or financial management) of transactions between two or more of the transaction parties as a function of the business rules for at least one distributor institution facilitating the transaction for a transaction party. In some applications, the host processor carries out selected aspects of transactions between two or more transaction parties as a function of business rules for different distributors, where each of the different distributors facilitates transactions on behalf of at least one of the two or more transaction parties. In this regard, the host processor facilitates generally distinct processing functions for each distributor and, where appropriate, functions as a generally silent partner to the transaction, relative to each distributor's clients.

Processing functions tailored to each distributor facilitate transactions between clients (e.g., buyers and/or sellers) using one or more of a variety of approaches as directed by each particular distributor, such as by processing transaction data, managing transaction party sales and/or marketing approaches or by financing aspects of individual and/or groups of transactions. For each particular transaction facilitated by a distributor, at least one of the transaction parties is a client of the distributor and, in some instances, different parties to a common transaction are clients of different distributors. In some applications, distributor clients are sponsoring clients who sponsor individual transaction parties into the system provided via the distributor. In this regard, each sponsoring client subscribes to the system via the distributor and accordingly provides services relative to the subscription to individual transaction parties (who need not necessarily subscribe to the system in the context that the sponsoring client subscribes).

In another example embodiment of the present invention, a central transaction management system uses business rules (e.g., included in profile information) associated with sponsoring transaction party participants and/or subscribing transaction parties (e.g., buyers, sellers sponsored by the participants) to process transactions involving the subscribing transaction parties. The sponsoring transaction parties generally implement functions, by way of sponsorship into the central transaction management system, including those related to sponsorship in the context of one or more of buyers, sellers, shippers and carriers, and in some applications, functions related to the financial aspects of the transactions.

Transactions processed by the central transaction management system generally involve merchant offerings, i.e., goods and/or services, characterized in agreements between the subscribing transaction parties and another party that may or may not be sponsored. Some transactions are based on financial services (or goods, where considered as such), where the product of the transaction involves things such as the provision of trade credit, underwriting, credit extension and currency conversion.

Other transactions processed by the central transaction management system are ancillary to transactions involving goods and/or services as discussed above. For instance, where network owners, network managers distributing network functions, participants sponsoring subscribers or the subscribers themselves engage in agreements related to the general processing of transactions, terms of these agreements are implemented by the central transaction management system. For these ancillary services, transaction products (as relative to the merchant offerings discussed above) involve things such as the automated transaction processing itself, record-keeping, accounting, expense classification, General Ledger posting and management, compliance reporting and data management.

In some applications, the sponsoring participants contract with network managers for use of the central transaction management system, which is in turn provided by a network owner. In certain applications, the network owner also functions as a network manager that provides the operational aspects of the system for use by sponsoring participants as well as for use by other network managers and their respective sponsoring participants. In this context, the network managers distribute subscription-based use of the central transaction management system to sponsoring participants, who in turn solicit subscribers-clients. Fees associated with the use of the central transaction management system are assessed at one or more levels of hierarchy, relative to the distribution of the use of the system, with contractual obligations relative to such fees generally functioning between adjacent levels of hierarchy. For instance, subscriber-clients are generally liable to the sponsoring participants, who in turn are liable to the network managers.

When the central transaction management system receives transaction information, the information is parsed for identifying characteristics that can be associated with sponsoring participants and subscribers providing the transaction information, or otherwise involved in a transaction relating to the transaction information. When these identifying characteristics match a particular sponsoring participant, the central transaction management system uses business rules for the sponsoring participant to process the transaction. In addition, when identifying characteristics for different subscriber parties to the transaction match different sponsoring participants, aspects of the transaction that are specific to each subscriber party are processed according to the subscriber party's corresponding sponsoring participant. Funds relating to the transaction are transferred according to the business rules associated with the sponsoring participant for each subscriber party, as well as the subscriber party itself, and to the particular characteristics of the transaction.

In certain processing applications involving network managers that distribute network functions, participant sponsors that sponsor subscribers (transaction parties) and subscribers themselves, the central transaction management system associates a chain of these parties to received transaction information. For instance, where "Buyer A" contracts with "Sponsor B" for processing transactions on behalf of the buyer, and where Sponsor B contracts with "Network Manager C" for use of the central transaction management system, these parties are associated with transaction documents received in relation to a transaction involving Buyer A. Business rules associated with these parties are used in processing the transaction, with hierarchical relationships between the respective parties used to determine financial and other responsibility relative to individual contract characteristics that affect the processing of the transaction.

The central transaction management system further isolates information as appropriate for contractual and/or regulatory purposes. For example, where multiple network managers distribute transaction processing functions to sponsoring participants, each network manager's processing functions are maintained discretely relative to other network managers. Similarly, within a suite of processing functions provided via a particular network manager to sponsoring participants, some or all of the information relating specifically to individual participants is maintained discretely relative to other sponsoring participants. Further, each sponsoring participant selectively maintains data for its subscribers discretely, relative to other subscribers. Access to data is accordingly regulated, such that confidential data be maintained and further such that regulatory-type compliance rules are complied with, i.e., to alleviate any potential for inappropriate price characterizations or other competitive-type issues.

In another embodiment, the central transaction management system is implemented with functional distribution among a variety of parties, with certain parties operating at two or more functional levels. Using the above example involving network managers that distribute network functions, participant sponsors that sponsor subscribers (transaction parties) and subscribers themselves, such operation involves one or more of these parties operating at two or more levels. In one example application, network managers also function as participant sponsors, directly sponsoring subscribing parties while also distributing network processing functionality to other sponsors who, in turn, sponsor other subscribing parties.

Where appropriate and/or required, operational characteristics of a particular dual-entity functioning at two or more levels are physically and/or functionally separated. For instance, where an entity is functioning as a network manager and also a participant sponsor as suggested above, the ability for participant sponsor operations (e.g., programmed processor implementations) of the dual-entity to access information available to the network manager operations of the dual-entity is restricted. In this regard, where participant sponsors engage in common business as competitors, the relationship of the participant sponsor entity also functioning as the network manager, relative to the central transaction management system, is configured to restrict access to its competitor's information. Furthermore, the restriction applies across competitors to limit the ability to ascertain pricing and/or other transaction-related information that is desirably kept separate. This restrictive approach is carried out while maintaining access to the network manager functions of the dual-entity in order to process transaction functions on behalf of its participant sponsors, and where appropriate, for regulatory purposes.

Business rules and other information specific to the different parties involved in processing with the central transaction management system are stored using one or more of a variety of approaches. For example, a database accessible by a central transaction management system and having labels or other identifying characteristics that associate the business rules with a particular party can be used. This database can be physically local or remote to the central transaction management system, with the central transaction management system accessing the database and controlling access to the database by other entities.

The processing functions, including those discussed in connection with core and operational functions, as discussed above can be implemented in a single location or across a variety of locations. Where appropriate, certain functionality of a central processor is implemented at different accessible locations communicatively coupled to one another. In addition, functionality of the central processor can be implemented at various levels in transaction hierarchy, such as with a network managing-distributor party or with transaction parties who are clients of and/or sponsored by financial institutions.

FIG. 1 shows an arrangement and approach 100 for transaction processing with multiple-layer transaction interactions at management, distribution and subscription levels, according to another example embodiment of the present invention. The arrangement and approach 100 implements a transaction processor 110 that facilitates transaction processing for system subscribers.

The transaction processor 110 includes a core processor 112 that carries out programmed functions globally across all parties (and their associated transactions or sponsored transactions) operating within the transaction processor 110. A network owner-administrator 140 establishes these core functions and further implements and provides control for the transaction processor 110. Information relative to the core processor, its functions and operability is stored in a database 120 accessible to the transaction processor 110. The database 120 also stores information relating to particular users of the arrangement 100, including profiles and/or business rules for the users, and contracts 118-N pertaining to transactions in which the users are involved. This stored information is used for processing transactions and, where appropriate, for authenticating incoming transaction data.

The database 120 is implemented in a variety of manners. For example, while shown situated remotely from the transaction processor 110, the database 120 is selectively integrated with the transaction processor and/or implemented at a disparate location. In addition, while shown implemented as a single arrangement, the database 120 may include several functional and/or physical arrangements, both local and remote to the transaction processor 110.

The network owner-administrator 140 distributes control of selected aspects of the transaction processor 110 to a plurality of network managers such as network managers 130-N and 160-N via the ability to specify transaction processing characteristics as defined, e.g., by the profiles/business rules 114-N and the contracts 118-N. These network managers separately implement the transaction processor 110, with clients of the network managers (e.g., sponsors and/or subscribers as described further below) functionally viewing the processing functions as exclusive to the network manager that facilitates the processing. In this regard, a distributor processor is crafted for each network manager and operates with the core processor 112 to provide transaction processing functions to sponsors and their subscribers on behalf of the network manager. That is, the core processor 112 interacts with each distributor processor to provide both core functionality and network manager-specific operational functionality. In this regard, the distributor processor for each network manager provides processing functions that are tailored specifically to a particular network manager, with transaction data generated and/or processed by each distributor processor passed to the core processor 112.

In some applications, distributor processors for network managers are stored, programmed or otherwise implemented in connection with the transaction processor 110. By way of example, various distributor processors 116-N are correspondingly shown implemented with the transaction processor 110. In other applications, a remote distributor processor 150 is implemented for a particular network manager (e.g., implemented at a network manager location such as its place of business). In still other applications, portions of the distributor processor for a particular network manager are implemented within the transaction processor 110 (with one of the distributor processors 116-N) and other portions of the distributor processor for that particular network manager are implemented remotely. Such a remote distributor processor function can be carried out with the remote distributor processor 150 and/or at one of the network manager locations 130-N.

While shown as distinct processor implementations, the core and distributor processors 112 and 116-N are selectively implemented in a common processor, with selective control for isolating or otherwise distinguishing core and operational processing characteristics. For example, where proprietary processing functions are programmed into a distributor processor for a particular network manager, those functions are maintained exclusively, such that the network owner-manager 140 is restricted in accessing the distributor processor functions. Regardless of the arrangement and access thereto, the output from these distributor processors 116-N is sent to the core processor 112. Where appropriate, the transaction processor 110 implements communications links to distributor processors 116-N using associated security-type criteria to ensure confidential and robust communications with each distributor processor.

Network managers interacting with the transaction processor 110 distribute transaction processing services to network participants (sponsors) for a variety of functions. Network managers 130-N distribute to buyer, seller and financier participants 131-136 (shown by example, with additional participants contemplated), and network manager 160 exclusively distributes financing functions to financiers 170-N. Each of the participants in turn provides access to the transaction processor 110 to clients including buyers, sellers and financiers, as relative to different transactions.

In some applications, other clients who are ancillary to transactions are facilitated access via one or more of the sponsoring participants, network manages or network owner-administrators. For instance, certain regulatory entities may be granted access to selected transaction aspects for purposes of ensuring compliance with regulations such as those applicable to accounting practices, customs and national security. This access, while facilitated by an entity at a particular hierarchical transaction level, is generally effected via the transaction processor 110, with the core and/or distributor processors managing the data access, e.g., as a function of security information and information that identifies entities for which the access is being granted.

Referring to the general network manager functions performed by network managers 130-N, participants accessing the transaction processor 110 through these network managers include seller participant-sponsors 131 and 133, buyer participant-sponsors 132 and 134 and financial institution participant-sponsor 136. Each of the participants sponsors subscribers into the system, with a few selected subscribers shown by way of example, including subscribers 1-N subscribing via the financial institution participant 136 and buyer subscribers 1-N subscribing via the buyer sponsor 134. Each of these subscribers provide information relating to transaction contracts in which the subscriber is involved, with the contracts being stored for access by the transaction processor 110 (e.g., with contracts 118-N stored in the database 120).

The transaction processor 110 maintains contract information, business rules and/or profiles 114-N separately for each subscriber and implements that information in processing transactions involving the subscribers. The transaction processor 110 maintains separate, secure storage for the business rules and profiles 114-N by restricting access thereto, e.g., by different network managers, sponsoring participants, subscribers or, where appropriate, the network owner-administrator 140.

Contract information 118-N is also maintained with access restricted relative to the level at which each instance of contract information is applicable. For example, where contract information pertains to an agreement between the buyer participant 133 and the buyer subscriber 135, access to the contract information is restricted to one or both of the network manager and the buyer sponsor. Where appropriate, access is also given to higher-level participants in the chain leading to involvement in the transaction processor 110 (e.g., the network manager 130 and/or the network owner-administrator 140 are granted access to information regarding a contract between the buyer sponsor 134 and buyer subscriber 135).

When transaction data is to be processed, incoming data is authenticated or otherwise associated with information corresponding to the sender of the information and/or transactions with which the sender is involved. For example, where a buyer subscriber 135 sends in order information via the network manager N, the authentication can be carried out in a variety of manners. In one application, the transaction processor 110 stores and uses profile information for the buyer subscriber 135 to authenticate the order information. In another application, the network manager N authenticates the order information and passes that information along to the transaction processor 110, which in turn authenticates the passed information as a function of profile information stored for the network manager N. Once received and authenticated, the order information is used to facilitate transaction processing (e.g., to facilitate payment for an invoice similarly received and authenticated, with the order information used to audit a payment amount specified in the invoice).

As discussed above, the database 120 may include separate data storage locations, with a portion thereof implemented, e.g., at a network manager or other remote node. In this regard, certain business rules, profiles and/or contract information are selectively stored at other nodes interactive in the chain of hierarchy for a particular transaction. For instance, using the above example involving buyer subscriber 135, contract information for a contract between the buyer subscriber 135 and the sponsoring buyer participant 134 is selectively stored at one or more of locations pertinent to the sponsoring buyer participant 134, network manager 130 or the transaction processor 110. Where the business rules, profiles and/or contract information are remotely stored, access to the rules is granted to the transaction processor 110 for selectively implementing the rules. In some applications, access to the rules is granted by providing the rules to the transaction processor 110 in connection with the specific processing of a particular transaction involving a participant to which the rules apply. In this regard, updates or other changes to the rules can be managed by network managers on behalf of their participant.

In many applications, the profiles, business rules and other programmed characteristics of the transaction processor 110 implement rules associated with contracts between transaction parties and between operators at different levels of transaction processing hierarchy for processing transaction information on behalf of transaction parties. For example, transaction data (e.g., transaction-based documents such as invoices or other financial documents) provided by client subscribers of a particular sponsoring participant is automatically associated with the sponsoring participant. The association of transaction data (and thus subscribers) with a particular processing distributor may involve, for example, using identification information provided with the transaction data for directly identifying a sponsoring participant or for identifying the subscriber and in turn using information for associating the identified subscriber with a sponsoring participant. The transaction documents are then processed according to relative business rules and/or profiles.

System users interact with the transaction processor 110 for providing transaction-related information, such as financial processing rules, accounting rules, orders, invoices, shipping documents, payment authorization data, payment execution data, customs documents, security documents and others. In some applications, this information is provided directly by individual users (e.g., subscribers 137-N and 170-N) or via other users in the hierarchical chain leading up to interaction with the transaction processor 110, such as via network managers and sponsoring participants. In addition, this transaction-related information may include information for relating the application of rules to transaction data, such as payment processes, credit extension and finance charges.

The user profiles and/or business rules discussed herein in connection with FIG. 1 above and otherwise may include a variety of information for use in transaction management and financial processing. For instance, in addition to the above-discussed approaches, profiles may include one or more of the following data: general ledger chart of account data, identification of computer systems submitting contract or transaction data, customer lists, vendor lists, financial institution lists, contract and price approval policies, transactional approval policies, business rules, operational roles (e.g., defining what functions a user associated with that role can perform), organizational hierarchy (e.g., defining how much of a company's data a user associated with a particular organizational node can access), and individual users. Financial institution profiles may also include information further defining the business relationship with selected customers or other processing distributors and financial processing organizations from the financial institution's perspective.

In some instances, financial institution subscribers provide rules that are stored in the database 120, with other users simply interacting with the transaction processor 110 under the rules provided by the financial institution subscriber (e.g., without providing any information for storage in the database 120). Where a particular financial institution is a sponsoring participant (e.g., participant 136), its subscribers may or may not have business rules and/or profile information stored at the database 120, and in this regard may similarly use rules stored on behalf of the sponsoring participant.

Again referring to the above example discussion involving the buyer subscriber 135, the transaction processor 110 processes payment for transactions involving the buyer subscriber using a contract between the buyer subscriber and another transaction party (e.g., a seller). Payment is selectively processed using transaction-finance processor functions implemented, e.g., in the transaction processor 110, with payment being facilitated directly from and/or via the extension of credit on behalf of a particular transaction party. The transaction processor 110 assesses one or more fees for the processing and charges the fees against the transaction and/or one or more transaction parties. The collection of the fee (or fees) is achieved, e.g., directly from payment made for the transaction, by drawing upon a credit line or by posting an entry in an accounting field, such as in an accounts payable field in a General Ledger associated with the buyer or another transaction.

Contracts characterizing relationships between operators at different levels of hierarchy are used to distribute and otherwise process the above-described assessed fees. For instance, again using the example involving the buyer subscriber 135, a contract between the buyer subscriber 135 and the sponsoring buyer participant 134 may specify that a certain percentage (e.g., 1%) of a transaction payment be assessed against the buyer subscriber 135 as a processing fee. This processing fee may be collected and distributed directly to the sponsoring buyer participant 134

The core and operational processing implementations 112 and 116-N are respectively interoperated to carry out the above-discussed fee processing approaches (e.g., with a use-fee processor implementation or implementations). For example, where the transfer of funds is carried out by the core processor 112 but where determination of an amount of funds (e.g., related to transaction processing fees) or other transfer-related characteristic is determined by a distributor processor, the distributor processor provides such information as necessary for the funds transfer to the core processor 112. In this regard, each distributor processor can be selectively tailored for particular fee-processing approaches, while the core processor 112 is adapted for fee-processing globally among different transaction parties. Each of the distributor processors 116-N and 150 are thus programmed to interface with the core processor 112, as is the core processor with each of the distributor processors.

The processing structure implemented with the core (112) and/or distributor processors (116-N and 150) is carried out specifically relative to contracts between the operating entities at various levels. For instance, fees assessed to subscribers may be transaction-based, where an amount of a transaction being processed is used to assess a fee. Fees at other levels of hierarchy in the transaction processing chain leading up to the network owner-administrator may be carried out similarly, as a function of a group of transactions facilitated via clients of particular entities participating in transactions via the transaction processor 110. Other approaches involve fixed fees or tiered fees, for example where an entity pays a fixed fee on a cyclic nature, or a tiered fee relative to a volume of transactions being sponsored or otherwise facilitated via the transaction processor 110.

In certain applications, selected fee processing functions are carried out in a proprietary manner, e.g., where one or both of the core and distributor processors process fee-based functions independently from one another and, where appropriate, with restricted access to the processing functions, inputs or outputs. For example, the core processor 112 may be limited in its ability to effect fee processing relative to each network manager, where fees processed on behalf of customers of that network manager are processed at a distributor processor for the network manager. In this regard, specific fee-processing functions proprietary to a network manager are unavailable to the core processor 112 and, accordingly unavailable to the network owner-administrator.

In transactions where proprietary processing is carried out, certain necessary information is selectively exchanged between the core and distributor processors while maintaining the integrity of proprietary aspects of the information. For example, where funds are transferred by the transaction processor 110 for a transaction between a particular buyer and seller, information such as the name of the buyer and/or seller, the goods and/or services involved in the transaction and terms of the transaction is kept separate from the core processor 112. Profiles/business rules for parties to a transaction, including those directly involved in a particular exchange or involved as a sponsoring participant or manager, are used to manage and implement approaches to maintaining the proprietary nature of the information.

The interoperation of the core and operational processing implementations 112 and 116-N, respectively, is also effected to carry out other transaction-based functions in a manner similar to that discussed in connection with the fee processing approaches above. For instance, where the transaction processor 110 is to carry out accounting-type functions, various individual functions are carried out at one or both of the core processor 112 and a distributor processor, with handoffs occurring between the two processors to facilitate data transfer necessary for carrying out the functions.

The financier network manager 160 and its subscriber financiers 170-N participate in the arrangement 100 in a variety of manners, depending upon the application. In some applications, one or more financiers provide financial resources to certain participants, network managers and subscribers operating with the transaction processor 110. For example, funds associated with the operation of the transaction processor 110 and use thereof are selectively provided by one or more of the financiers 170-N at the request of parties to transactions and/or agreements involving the transaction processor. In this regard, fees associated with a particular operation of the transaction processor 110 are underwritten, transferred or otherwise processed by selected financiers as appropriate for the particular entities involved in the transaction (e.g., as specified in that entity's profiles or business rules).

In some applications, one or more of the financiers 170-N, via the network manager 160 acting as a financial processing distributor, interact with the transaction processor 110 in a financier-based distribution system, further sponsoring buyers and sellers who interact with one of the financiers 170-N. This approach is implemented in a manner not inconsistent with the approach discussed in connection with U.S. patent application Ser. No. 11/151,747, (USBA.132PA), filed concurrently herewith and which claims priority to the above-referenced U.S. Provisional Patent Application Ser. No. 60/578,375 and which is fully incorporated herein by reference.

In some applications, subscribers sponsored by one of the network managers 130-N use financial processing functions provided by one of the financiers 170-N in connection with the transaction processor 110. In certain embodiments, the subscribers establish a direct relationship with one of the financiers 170-N or with the financier network manager 160. In other embodiments, the subscribers engage one of the financiers 170-N at the direction of the transaction processor 110, for example where the transaction processor 110 facilitates the provision of trade credit for a multitude of subscribers and either provides the credit directly or sells the trade credit to one or more financiers or financier network managers. Credit, in this sense, involves paying a seller or related transaction party on behalf of a buyer, extending credit to the buyer commensurate with the payment and, ultimately, collecting, from the buyer, the payment and any associated fees. This provision of credit and related processing is automatically carried out, using business rules and/or user profiles to appropriately pay and collect for the transaction and associated fees; in some instances, auditing in connection with such payment and credit extension is also carried out to ensure that payment is proper, also using the fees. In addition, credit is selectively extended using a credit term such as a credit rating relating to one or more of buyer or seller transaction parties, or a distributor (or other) sponsoring party that sponsors one of the buyer or seller transaction parties.

Using buyer subscribers 135-N as an example, each of these subscribers can interact directly with one or both of the financier network manager 160 and the financiers 170-N, as indicated by the communication links shown in FIG. 1. Contract information indicating such relationships is stored with contracts 118-N in the database 120 and used by the transaction processor 110 to facilitate the processing of financial aspects of transactions on behalf of the buyer subscribers 135-N.

Referring again to the buyer subscribers 135-N, the transaction processor 110 facilitates the selective interaction of each with one or more of the financiers 170-N (and the financier network manager 160) at the direction of the transaction processor 110 and, where appropriate, other network managers and sponsoring participants via which the subscriber has access to the transaction processor. Profiles and/or business rules for each of the buyer subscribers 135-N are used to identify, characterize or otherwise facilitate this selective interaction, with financial aspects of transactions being processed using one or more of the financiers 170-N accordingly.

In another example embodiment, a monitoring system 180 is maintained with the transaction processor 110, inclusively or remotely, and monitors access to various processing implementations. The activities of the monitoring system 180 are made available on a selectively public nature, in the context of those public to a particular set of processing functions carried out for a network manager or its clients. In this regard, both the network owner-administrator 140 and the network manager can ensure that its proprietary functions are protected. For example, where the network manager 130 develops operational programming implemented at the distributor processor 116, the monitoring system 180 monitors interactions between the distributor processor and aspects of the transaction processor 110. Both the network owner-administrator 140 and the network manager 130 have access to information garnered by the monitoring system 180 relative to the distributor processor 116, with the monitoring system making available information showing access to the distributor processor without showing proprietary content or other aspects of the distributor processor. In some applications, the monitoring system 180 also monitors interactions with the core processor 112. In this regard, confidential operation is maintained while facilitating the selective monitoring of the transaction processor 110.

In some implementations, the monitoring system 180 is programmed to provide data accessible by regulatory entities to ensure confidentiality of information is maintained from a regulatory perspective, such as by ensuring anti-competitive regulations are followed. For instance, where two or more entities operate in a particular market and use the transaction processor 110 to implement their respective transactions, it may be important to ensure that each entity is excluded from access to pricing information relating to transactions between others of the two or more entities and other clients. In such a situation, the monitoring system 180 monitors access to price information and generates data for use by appropriate regulatory entities (or simply for recordkeeping by the transaction processor 110, in the event that access to the data is desirable). In some applications, the monitoring system 180 generates data and sends that data to a particular regulatory entity for evaluation purposes.

For general information regarding data exchange and for specific reference to data exchange approaches that may be implemented in connection with this or other example embodiments herein, reference may be made to U.S. patent application Ser. No. 11/120,629 (USBA.123PA), filed on May 3, 2005, which claims priority to U.S. Provisional Patent Application Ser. No. 60/578,376, filed on Jun. 9, 2004 and entitled "Automated Transaction Processing System and Approach," which are both fully incorporated herein by reference.

In addition to the above examples, implementations of the core (112) and operational (116-N and 150) processors can be carried out in a variety of manners, tailored to specific processing characteristics or generalized for processing with a multitude of network managers, sponsoring participants and subscribers. For general information regarding transaction processing approaches and for specific information regarding transaction processing implementations carried out by the transaction processor 110 in connection with various example embodiments, reference may be made to the following patent documents, each of which is fully incorporated herein by reference: U.S. Pat. No. 5,910,896, No. 6,571,149, No. 6,697,702 and No. 6,704,612, all to Hahn-Carlson; U.S. patent application Ser. No. 10/436,878 (USBA.101PA); and to U.S. Provisional Patent Application Ser. No. 60/578,375. For example, where the core processor 112 authorizes payment, an auditing process such as those discussed in the aforesaid patent documents is selectively implemented, using contract rules agreed upon by parties to a transaction, to derive a payment term for the transaction and which is used to facilitate the payment.

Figure 2:
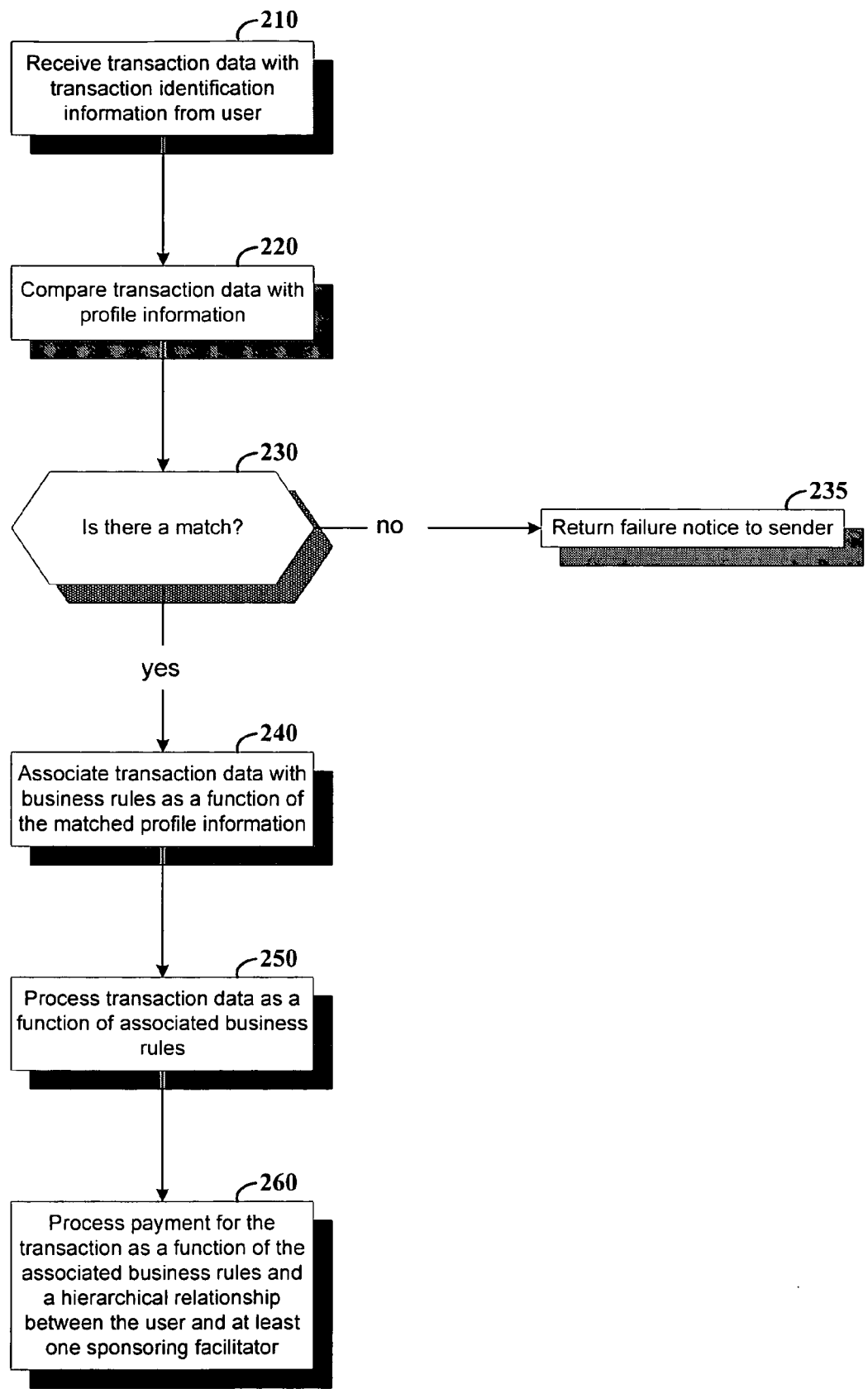
FIG. 2 shows transaction processing approach involving operational layers implemented specifically to particular distributor-based entities, according to another example embodiment of the present invention.

FIG. 2 shows a flow diagram for transaction management among transaction parties, according to another example embodiment of the present invention. The approach shown in FIG. 2 may, for example, be implemented in connection with an arrangement such as that shown in FIG. 1, or a similar arrangement implementing transaction processing functions. This flow diagram shows an example process followed in receiving and processing transaction data, such as those indicating that conditions for payment have been met (e.g., an invoice with payment authorization, or where invoices are automatically approved as a function of user profiles and business rules).

At block 210, transaction data is received and includes information having sufficient identification information for associating the transaction data with appropriate users, such as a buyer or seller subscriber, a sponsoring participant and/or a network manager. The identification information in the transaction data is compared to profile information at block 220 to determine whether the data is associated with a particular transaction management user. If a match is not found at block 230, a failure notice is returned to the sender of the transaction data at block 235. For example, if a user is not subscribed to processing services, or if identification information in the transaction document is incorrect, a failure notice indicating so is sent to the sender and/or to transaction parties associated with the sender (e.g., identified via the transaction document or information available via stored profile data). In addition, if the sender's subscription to transaction processing services has expired, or if a sponsoring party via which the sender is accessing the services has a similar expiration, the transaction data cannot be processed and an appropriate failure notice is sent at block 235.

If a match is found at block 230, the transaction data is associated with business rules corresponding to the transaction identification information and matched profile information at block 240. Business rules associated with the transaction data may include those from one or more transaction parties including, for example, business rules for the sender of the transaction party, for a subscriber party associated with the transaction and/or for a sponsoring/facilitating transaction party via which subscriber parties access the transaction management system.

After appropriate business rules have been identified and associated with the transaction data, the truncation data is processed using the associated business rules at block 250. This processing involves one or more of a variety of transaction functions, such as order approval, invoice approval, payment authorization, payment initiation, and others, e.g., as discussed in this document.

When a transaction reaches the payment stage, as facilitated by the transaction data received at block 210 and/or by the business rule-based processing at block 250, payment is processed at block 260. The payment processing generally involves the use of the business rules associated with the transaction data, as well as associated profile information identifying transaction parties on a hierarchical level sponsoring the transaction processing on behalf of one or more subscribers engaging in the transaction. Referring to FIG. 1 by way of example, such a hierarchical relationship includes subscribers, sponsoring participants, network managers and a network owner-administrator, facilitating the transaction processing via the transaction processor 110.

Figure 3:
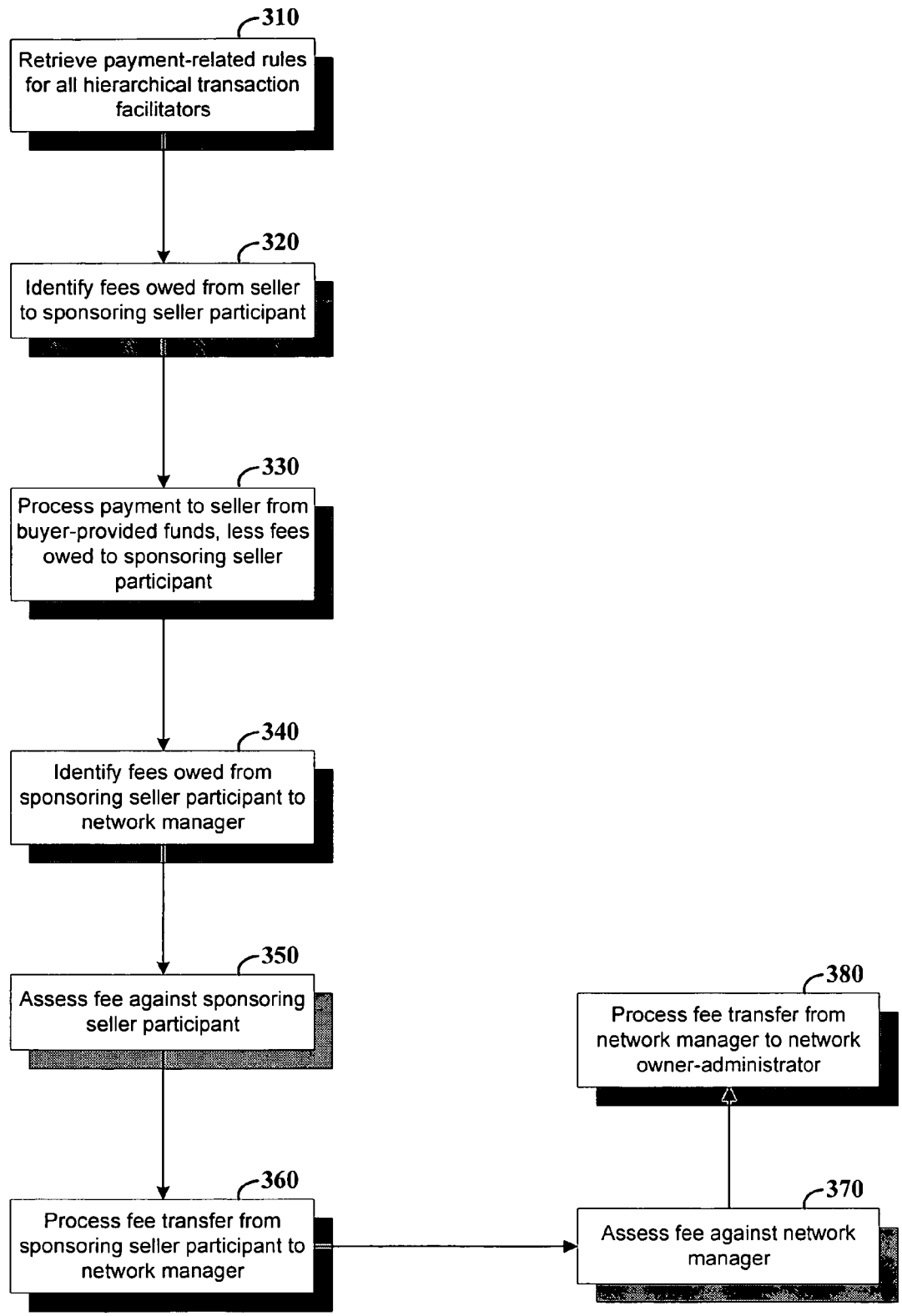
FIG. 3 shows a flow diagram for transaction processing, according to another example embodiment of the present invention.

FIG. 3 shows a flow diagram for transaction processing involving the processing of payment and/or fees associated with a transaction, according to another example embodiment of the present invention. The approach shown in FIG. 3 is implemented with a variety of approaches such as those discussed herein. For instance, the payment processing carried out at block 260 of FIG. 2 is selectively implemented with one or more of the approaches shown in FIG. 3. Similarly, payment processing carried out in connection with the example embodiments shown in and discussed with FIG. 1 is also selectively implemented using such an approach. For purposes of discussion, the following description made in connection with FIG. 3 is directed to a transaction involving a buyer and a seller, with payment for the transaction made by (or on behalf of) the buyer to the seller (or to the seller's financial institution and/or credit-based account). Such a transaction generally includes goods and/or services, with the buyer paying for the goods/services upon the seller's provision thereof or otherwise agreed-upon point in an ongoing transaction.

Beginning at block 310, payment-related rules and, where appropriate, contract data, are retrieved for all hierarchical transaction facilitators associated with a particular transaction document. For example, referring to FIG. 1, where a buyer subscriber 135 initiates payment for a transaction by sending transaction data including an acceptance of goods or other payment authorization type of information, that data is parsed and used to identify transaction facilitators. In this instance, the facilitators include the sponsoring buyer participant 134, the network manager N and the network owner-administrator 140; business rules associated with each of these parties, together with appropriate contract information characterizing relationships between these parties, is retrieved.

Using the retrieved information, fees owed from a seller to a sponsoring seller participant are identified at block 320. These fees may involve, for example, a percentage-based fee assessed against an amount of funds transferred in connection with the transaction. Payment is processed to the seller from buyer-provided funds at block 330. The payment is reduced by an amount of fees owed to a seller participant sponsoring the seller into use of the transaction processing approach.

At block 340, fees owed from a sponsoring seller participant, to which owed fees were identified at block 320, to a network manager are identified. These fees may, for example, be applied on a transaction-specific basis (e.g., as a percentage of purchase price), on a tiered basis (e.g., with fee level associated with tiers of transaction amounts) as a flat fee per transaction or as a flat fee per period. Using one or more of these approaches, fees are assessed against a sponsoring seller participant at block 350 (e.g., by indicating an amount owed or, where directly applied, by affecting the payment processing function at block 330, as described further below).

A fee transfer from (or on behalf of) the sponsoring seller participant is processed to a network manager at block 360. Where the fee is processed directly from the sponsoring seller participant, funds from an associated bank account and/or credit line are transferred. Where processed indirectly, the funds may, for example, be taken from funds provided by the subscribing seller, prior to passing payment to the sponsoring seller participant.

At block 370, a fee is assessed against the network manager as a function of the transaction for which the payment-related rules are received at block 310. As described above in connection with the fee assessed at block 350, fees are assessed using one or more of a variety of approaches such as those involving one or more of a percentage, tier or flat-fee based approach. A fee transfer for the assessed fees is effected at block 380, with the fees going to a network owner-administrator type of entity facilitating the transaction processing.

Figure 4:
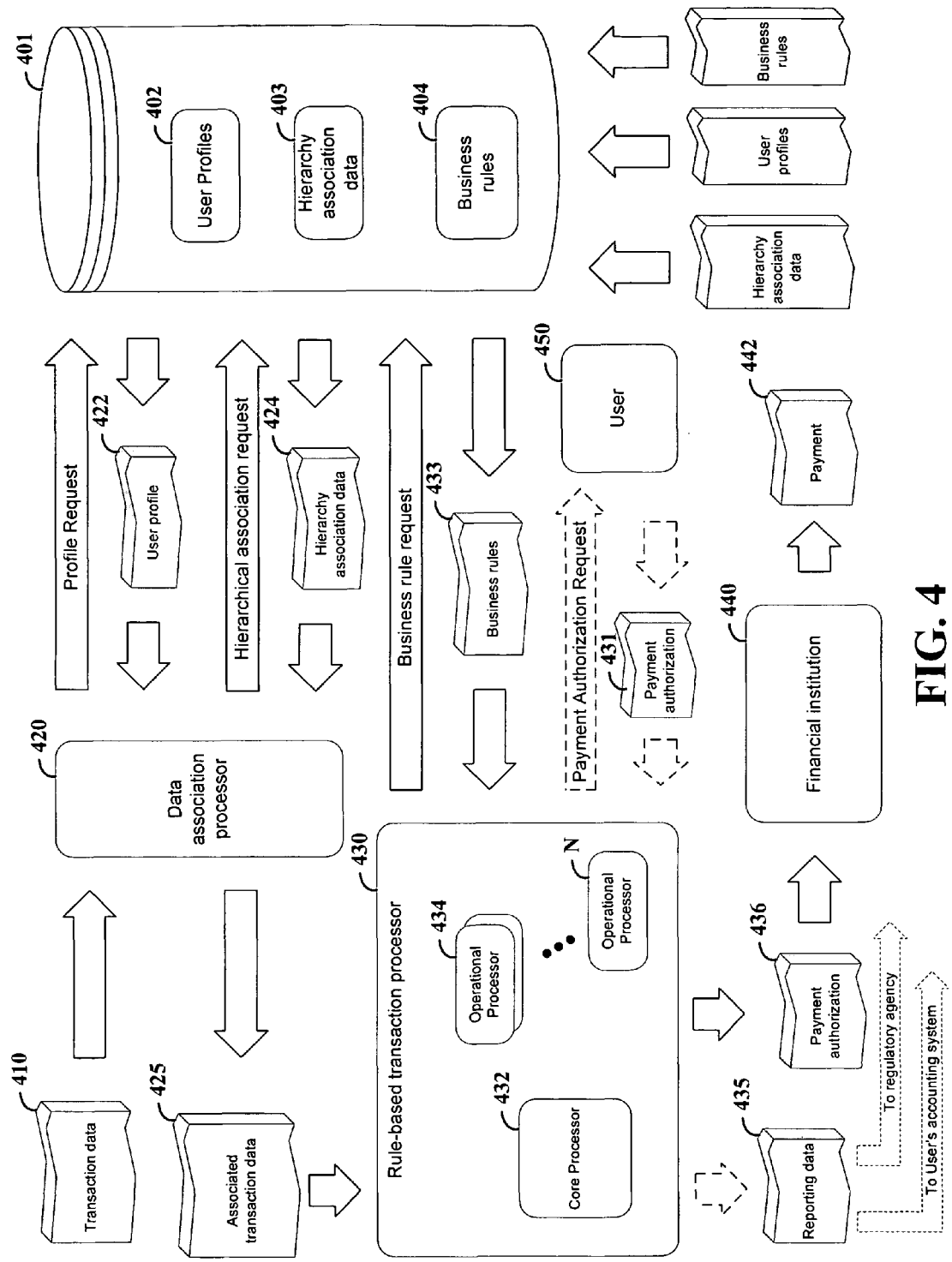
FIG. 4 shows a flow diagram for implemented core and operational processing functions for transaction processing, according to another example embodiment of the present invention.

FIG. 4 shows a flow diagram for implementing core and operational processing functions that separately and integrally process transactions, according to another example embodiment of the present invention. The approach shown in FIG. 4, as with the above-discussed flow diagrams in FIG. 2 and FIG. 3, is selectively implemented with a system such as that shown in FIG. 1, also discussed above. Certain approaches discussed below accordingly make reference to FIG. 1 by way of example, with the approaches being applicable to a multitude of transaction processing systems and approaches.

The approach shown in FIG. 4 implements a data association processor 420 and a rule-based transaction processor 430, both of which access stored information in a database arrangement 401, which can be singular or implemented with different databases and, where appropriate, at different locations. Information stored in the database arrangement 401 includes user profiles 402, hierarchy association data 403 and business rules 404, provided, e.g., by subscribing and/or sponsoring transaction parties. The user profiles 402 generally include information specific to individual users, such as the user's identification, security information (for accessing/using the transaction processing approach) financial information (e.g., funds source and/or repository) and preference information. Users, in this context, involve entity uses such as businesses as well as individual users who may act on their own behalf or on behalf of such an entity. The hierarchy association data 403 includes information identifying hierarchy associated with particular users and sponsoring parties, and in some instances, is implemented directly with the user profiles 402 or otherwise linked thereto (e.g., with a code or other identifying information). The business rules 404 include information used to process transactions, such as information indicating contract terms, payment approval policies and others.

When transaction data 410 is received at a data association processor 420, requests are made to the database 401 for profile data as well as hierarchical association data. These requests are made, for example, buy directly accessing the database arrangement 401 when the database is locally accessible to the data association processor 420, or using, for example, a controller associated with the database arrangement. Where the database arrangement 401 is implemented in two or more separate database implementations, the requests are accordingly directed to an appropriate database implementation that can serve the request.

In response to the requests, the database arrangement 401 returns user profile data 422 and hierarchy association data 424. The data association processor 420 associates a particular user providing the transaction data 410 (e.g., a subscribing seller) with the transaction, as well as entities hierarchically sponsoring the user into the transaction processing approach, such as a sponsoring participant and a network manager. In some applications, the user profiles 402 include profile information for sponsors as well as the user, either within the same profile or by linking to another sponsor profile.

Once the user profile and hierarchical association data is associated with the transaction data, the associated transaction data 425 is provided to the rule-based transaction processor 430. A core processor 432 and a plurality of operational (e.g., distributor) processors 434-N carry out processing functions for the rule-based transaction processor 430 in a manner similar, e.g., to similar functions shown in and described in connection with the core and distributor processors of FIG. 1. The core processor 432 carries out processing functions set by an upper level hierarchical entity, such as a network owner-administrator. Each of the operational processors 434-N carries out processing functions set by a sponsoring type of hierarchical entity, such as a network manager. These core and operational processors are selectively carried out at different locations and/or with certain processing functions and/or information being maintained in a proprietary manner. In this regard, certain operational processing functions are maintained independently from the core processor 432 while facilitating interaction therewith for processing the associated transaction data 425 (i.e., for providing transaction information to the core processor).

Upon receipt of associated transaction data 425, the core processor 432 sends a business rule request to the database 401 (or to another database implementation), which returns business rules 432 associated with the identified user profile 422 and hierarchy association data 424. The business rules 432 include information characterizing the use of one or more of the operational processors 434-N and its implementation with the core processor 432. In this regard, the core processor 432 implements selected rules from the business rules 404 that are associated with one or more upper-level transaction facilitators, according identified by the hierarchy association data 403 retrieved by the data association processor 420. The core processor uses rules associated with the upper level hierarchical entity, for which the core processor 432 is implemented, to process the associated transaction data 425. In some applications, the operational processor 434 similarly implements selected rules from the business rules 404 in processing designated characteristics of the transaction to which the associated transaction data 425 pertains. This processing by the core processor 432 and the one or more operational processors 434-N includes facilitating the completion of a transaction, such as by auditing the associated transaction data 425 to ensure the propriety of payment related to the associated transaction data.

Once the associated transaction data has been processed by the rule-based transaction processor 430, steps towards completion of a transaction involving the associated transaction data are carried out. In some instances, the business rules 432 provide information indicating that payment can be authorized directly by the rule-based transaction processor 430 (e.g., after an audit of the associated transaction data indicates that payment is ripe). In other instances, a payment authorization request is sent to a user 450. This request may, for example, include transaction information such as an indication that a good or service has been tendered and/or a condition of that good or service. When approved, the user 450 sends a payment authorization 431 back to the rule-based transaction processor.

Once payment has been authorized, via an outside user (450) or at the rule-based transaction processor 430, a payment authorization 432 is sent to a financial institution 440. In turn, the financial institution 440 makes a payment 442 to an entity identified in the associated transaction data 425 and/or with information returned from the database 401. The payment 442 includes, for example, one or more of a funds transfer, a debiting of a credit account, a crediting of a credit account or the provision of information that can be used to collect payment. In some applications, payment authorization and other payment-related functions pertaining to credit extension are implemented using a transaction-finance processor, e.g., at the rule-based transaction processor 430.

In some applications, the rule-based transaction processor also generates reporting data 435 for use in auditing transactions. This reporting data 435 is useful, for example, in facilitating accounting review by a regulatory agency to ensure compliance with appropriate regulations. This reporting data 435 is also useful to entities involved in a particular transaction, whether directly or as a sponsoring type of party. In this regard, the reporting data 435 is selectively sent to a user's accounting system, or generally to a user's system where the data can be used for accounting, auditing or other purposes.

Figure 5:
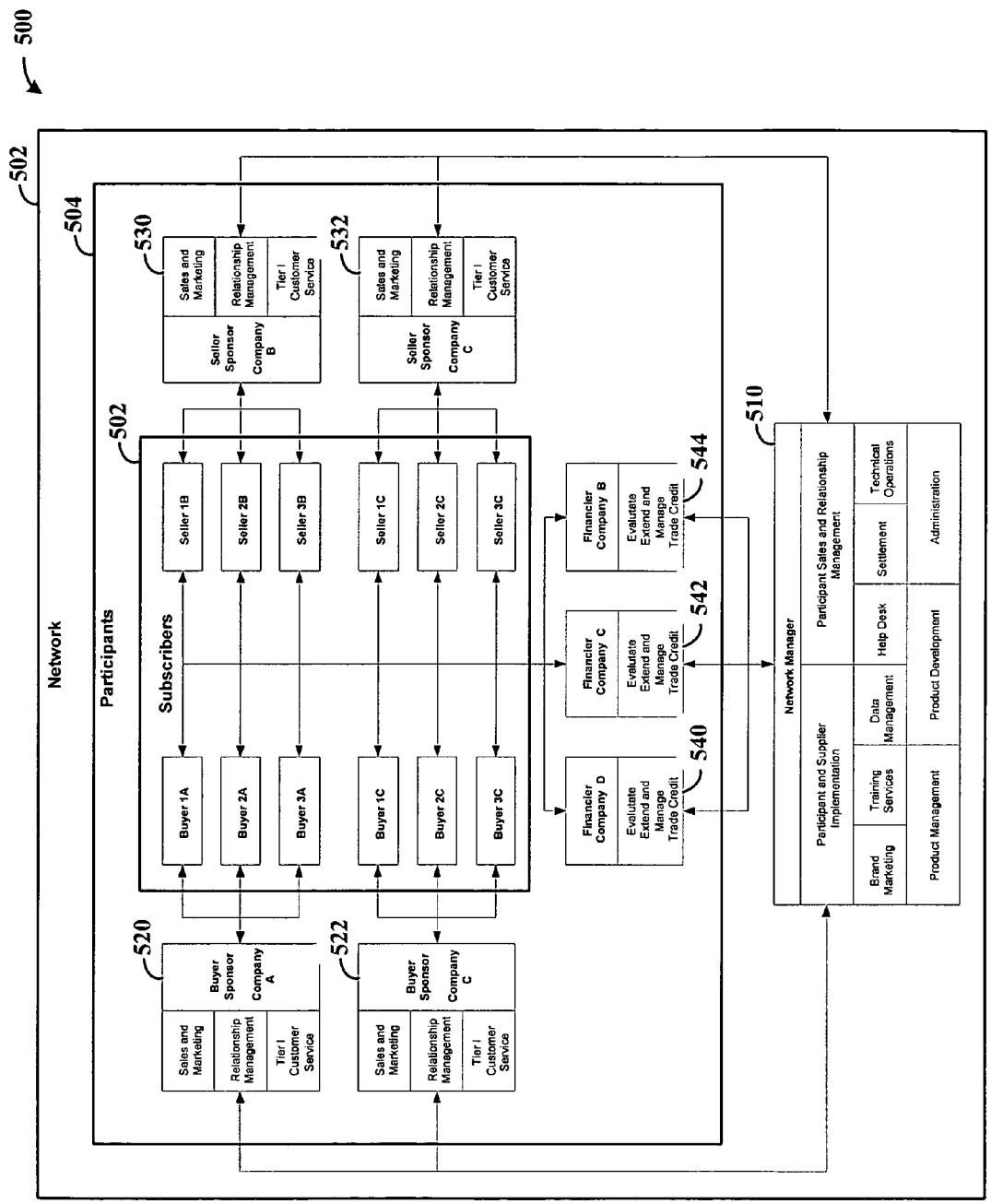
FIG. 5 shows a hierarchical implementation of a transaction processing network, according to another example embodiment of the present invention.

FIG. 5 shows a network-based transaction processing arrangement 500 with managing, participating and subscribing layers, according to another example embodiment of the present invention. The arrangement includes a network 502, which includes a participant layer 504 and a subscriber layer 502.

The network layer 502 includes a network manager processor 510, which is adapted for implementing a variety of functions for processing transactions involving subscribers that are sponsored by participants. In this regard, functions implemented at the network manager processor 510 are configured for supporting sponsor-based processing using, e.g., profiles for each sponsor as discussed in other example embodiments above. For example, referring to FIG. 1, the network manager processor is selectively implemented in a manner similar to that discussed in connection with the transaction processor 110, with core functionality being implemented across users in the network and operational functionality being implemented for each sponsor as described below. Selected example network manager functions are shown with the network manager processor 510, and include functions supporting product management and development, brand marketing, training, data management, help desk management, settlement (i.e., for payments made), technical operations, participant sales and relationship management and participant and supplier implementations.

Participants in the participant layer 504 include buyer sponsors 520 and 522, seller sponsors 530 and 532, and financiers 540, 542 and 544. Each buyer and seller sponsor respectively sponsors buyers and sellers into the network 502, and the financiers facilitate financial aspects of transactions involving the buyers and sellers.

The buyer and seller sponsors each provide (e.g., via a processor arrangement), sales and marketing-based processing, relationship management processing and customer service processing. These functions are carried out in connection with subscribers in the subscriber layer 502 who are sponsored by the buyer or seller sponsor providing the functions. Further, each buyer and seller sponsor facilitates interaction with the network manager processor 510 for each sponsored subscriber, via interaction with a processor at the respective sponsors. In some applications, functions shown associated with each of the buyer and seller sponsors are carried out at the network manager processor 510.

The subscriber layer 502 includes a multitude of subscribers who are sponsored into participation in the network 502 by one of the buyer and seller sponsors 520, 522, 530 and 532. Here, buyers 1A-3A are sponsored by buyer sponsor 520, buyers 1C-3C are sponsored by buyer sponsor 522, sellers 1B-3B are sponsored by seller sponsor 530 and sellers 1C-3C are sponsored by seller sponsor 532. Each of the subscribers in the subscriber layer 502 transact with one or more of the other subscribers, with financial (and, in some instances, other) aspects of the transactions facilitated by the network manager processor 510 via sponsorship in the participant layer 504.

The financiers 540-542 in the participant layer 540 interact with the subscribers in the subscriber layer 502, either directly or indirectly through the network manager processor 510. Each financier facilitates processing functions including evaluating, extending trade credit and managing trade credit. In some applications, some or all of these functions are facilitated at the network manager processor 510. For instance, where the network manager processor 510 implements profiles and/or contract data to authorize payment for a transaction, the authorization can be used by the financiers to evaluate trade credit. Once payment for a transaction is evaluated and approved by a financier, that financier pays a seller subscriber and bills a buyer subscriber for the transaction. Where appropriate, the financier also facilitates the collection of fees for use of the network manager processor 510, such as by withholding a percentage of the payment to the seller subscriber or by billing the buyer subscriber for a processing fee in addition to an amount to cover the transaction amount paid to the seller.

While certain aspects of the present invention have been described with reference to several particular example embodiments, those skilled in the art will recognize that many changes may be made thereto without departing from the spirit and scope of the present invention, aspects of which are set forth in the following claims.

What is claimed is:

1. An automated transaction processing system comprising:
   a transaction processor that comprises a core processor and a plurality of distributor processors, each of the distributor processors associated with a different network manager in a plurality of network managers, each of the network managers being an entity that distributes transaction processing services to network participants that provide access to the transaction processing system to buyers and sellers,
   wherein the core processor is configured to:
      receive transaction data associated with a transaction involving at least one of the buyers or at least one of the sellers,
      determine that the transaction data is associated with a particular network manager in the plurality of network managers, and
      retrieve business rules associated with the transaction data, the business rules associated with the transaction data including business rules associated with the particular network manager and business rules associated with a network owner-administrator; and
   wherein the core processor and the distributor processor associated with the particular network manager are configured to use the business rules associated with the transaction data to perform transaction processing functions that are tailored to the particular network manager, the transaction processing functions including auditing the transaction data to ensure propriety of payment related to the transaction data.

2. The system of claim 1, wherein the distributor processors and the core processor are implemented on a common processing arrangement.

3. The system of claim 2, wherein the distributor processors are configured and arranged to implement programming code proprietary to each of the network managers when respectively processing transactions on behalf of the particular ones of the network managers.

4. The system of claim 1, wherein the distributor processors are programmed exclusively for processing of transaction information on behalf of different ones of the network managers.

5. The system of claim 1, further comprising a remote processor for the particular network manager, the remote processor located at a remote location, the remote processor configured for interfacing with contracting parties and configured to provide transaction data from the contracting parties to the distributor processor associated with the particular network manager.

6. The system of claim 5, wherein the distributor processor associated with the particular network manager includes an auditing processor and the remote processor, the auditing processor being configured to audit said transaction data provided by the remote processor.

7. The system of claim 6, wherein the remote processor is configured to authenticate transaction data received from contracting parties as a function of user profiles for the contracting parties, and wherein the auditing processor is configured to authenticate transaction data received from the remote processor as a function of user profiles for at least one of the plurality of network managers.

8. The system of claim 1, wherein the distributor processors are configured and arranged to provide data to the core processor for use in processing selected transaction aspects, and to maintain integrity of other data used in audits by limiting access to the data via the core processor.

9. The system of claim 8, wherein the distributor processors are configured and arranged to provide data to the core processor by providing data authorizing payment for transactions.

10. The system of claim 9, wherein the data authorizing payment for the transactions includes at least one of:
  a payment source;
  a payment destination;
  credit authorization; and
  currency conversion terms.

11. The system of claim 1, wherein the distributor processors are configured and arranged to provide data authorizing payment for the transaction data to the core processor as a function of the audit.

12. The system of claim 11, wherein the data authorizing payment for the transaction data includes at least one of:
  a payment source;
  a payment destination;
  credit authorization; and
  currency conversion terms.

13. The system of claim 1, wherein the distributor processors are implemented at least in part at the core processor.

14. The system of claim 13, further comprising a processing isolation function configured and arranged for inhibiting the network owner-administrator from accessing distributor processor functions implemented at the core processor.

15. The system of claim 1, further comprising:
  a data storage arrangement configured and arranged to store sets of business rules provided by each of the network managers.

16. The system of claim 1, further comprising:
  a transaction-finance processor configured and arranged to facilitate financing of transactions as a function of audits thereof; and
  a use-fee processor configured and arranged to assess a fee as a function of transactions processed on behalf of each of the network managers and network participants.

17. The system of claim 16, wherein the transaction-finance processor is configured and arranged to facilitate a funds transfer in the amount of the fee assessed by the use-fee processor.

18. The system of claim 17, wherein the transaction-finance processor is configured and arranged to facilitate a funds transfer in an amount of the fee assessed by the use-fee processor by assessing the fee against a credit account for the particular network manager.

19. The system of claim 16, wherein the transaction-finance processor is configured and arranged to facilitate payment for the transaction data as a function of the audit of the transaction data and information in the transaction rules associated with the transaction data pertaining to a business relationship between the particular network manager and a contracting party involved in the payment.

20. The system of claim 16, wherein the transaction-finance processor is configured and arranged to facilitate the payment for the audited transaction data by extending trade credit to at least one contracting party.

21. The system of claim 20, wherein the transaction-finance processor is configured and arranged to extend trade credit to the at least one of the contracting party as a function of a credit term relating to the particular network manager.

22. The system of claim 16, wherein the use-fee processor is configured and arranged to assess a fee as a function of transactions processed on behalf of each of the network managers by assessing a fee against each of the network managers on behalf of the network owner-administrator as a function of transactions processed on behalf of each of the network managers.

23. A computer-implemented method comprising:
  receiving, at a core processor of a transaction processing system, transaction data associated with a transaction involving a buyer and a seller;
  determining, at the core processor, that the transaction data is associated with a particular network manager in a plurality of network managers, each of the network managers being an entity that distributes transaction processing services to network participants that provide access to the transaction processing system to buyers and sellers, each of the network managers associated with a different distributor processor in a plurality of distributor processors in the transaction processing system;
  retrieving, at the core processor, business rules associated with the transaction data, the business rules associated with the transaction data including business rules associated with the particular network manager and business rules associated with a network owner-administrator; and
  using, at the core processor and the distributor processor associated with the particular network manager, the business rules associated with the transaction data to perform transaction processing functions that are tailored to the particular network manager, the transaction processing functions including auditing the transaction data to ensure propriety of payment related to the transaction data.

* * * * *